United States Patent [19]

Nakahira

[11] 4,429,068

[45] Jan. 31, 1984

[54] RUBBER MATERIAL

[75] Inventor: Akitaro Nakahira, Takarazuka, Japan

[73] Assignee: Hohyu Rubber Co., Ltd., Ikeda, Japan

[21] Appl. No.: 323,047

[22] Filed: Nov. 19, 1981

[30] Foreign Application Priority Data

Nov. 20, 1980 [JP] Japan ................................ 55-164192
May 20, 1981 [JP] Japan .................................. 56-77077

[51] Int. Cl.³ .......................... C08K 5/41; C08L 7/00; C08L 9/06; C08L 21/02
[52] U.S. Cl. ..................................... 524/302; 152/310; 428/156; 523/453; 524/303; 524/304; 524/305
[58] Field of Search ............... 524/302, 303, 304, 305, 524/739, 760; 523/453; 428/156

[56] References Cited

U.S. PATENT DOCUMENTS

| | | | |
|---|---|---|---|
| 1,967,292 | 7/1934 | Holczer | 524/302 |
| 2,451,865 | 10/1948 | O'Brien | 524/302 |
| 2,454,283 | 11/1948 | King | 524/302 |
| 2,671,249 | 3/1954 | Rockoff | 524/302 |
| 3,317,444 | 5/1967 | Topcik | 524/302 |
| 4,350,787 | 9/1982 | Kimpel | 524/302 |

*Primary Examiner*—Ronald W. Griffin
*Attorney, Agent, or Firm*—Armstrong, Nikaido, Marmelstein & Kubovcik

[57] ABSTRACT

A rubber material which is a cured rubber having a hardness of from 30° as measured with an A-type rubber hardness tester to 15° as measured with an F-type rubber hardness tester and an impact resilience of not less than 50%. The material has excellent vibration-proof, sound-proof, shock-absorbing or cushioning properties and is useful as a material for vibration-proof, sound-proof, shock-absorbing and cushioning members.

14 Claims, 49 Drawing Figures

RUBBER MATERIAL

BACKGROUND OF THE INVENTION

The present invention relates to a novel rubber material. More particularly, it relates to a rubber material having a hardness of from 30° as measured with an A-type rubber hardness tester to 15° as measured with an F-type rubber hardness tester and an impact resilience of not less than 50%, which material is especially useful as vibration-proof (or vibration-isolating, vibration-absorbing or vibration-damping) materials, soundproof (or sound-isolating or sound-absorbing) materials, shock-absorbing materials or cushioning materials.

A variety of rubber materials have so far been used as vibration-proof, sound-proof, shock-absorbing or cushioning materials. However, conventional vibration-proof materials are poor in vibration-absorbing characteristics, especially in the superlow frequency range of about 5 Hz to about 10 Hz. Therefore, when such rubber materials are used in making rubber sheets for record player turntable, vibration insulators for record player, etc., outside vibrations cannot be excluded efficiently, hence high fidelity reproduction of source sound can hardly be expected. Conventional soundproof, shock-absorbing or cushioning rubber materials are also unsatisfactory.

OBJECTS OF THE INVENTION

It is an object of the present invention to provide a novel rubber material having excellent vibration-proof, sound-proof, shock-absorbing and cushioning properties.

This and other objects of the present invention will become apparent from the description hereinafter.

DETAILED DESCRIPTION

Figure 1:
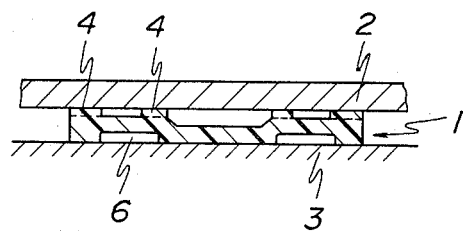
FIG. 1 is a vertical cross-sectional view illustrating an embodiment of the vibration insulator wherein the rubber material of the present invention is used.

The present invention provides a cured rubber material having a hardness of not more than 30°, preferably not more than 20°, more preferably not more than 10°, as measured with an A-type rubber hardness tester, and not less than 15°, preferably not less than 30°, as measured with an F-type rubber hardness tester, and an impact resilience of not less than 50%, preferably not less than 60%, more preferably not less than 70%.

In the foregoing, the A-type rubber hardness tester is a rubber hardness tester as described in Japanese Industrial Standard (JIS) K 6301-1969. The F-type rubber hardness tester means Asker F rubber hardness tester available from Kobunshi Keiki Mfg. Co., Ltd., which is used mainly in measuring the hardness of foamed rubber, polyurethane foam or the like. The rubber material of the present invention, though it is a solid rubber material, has a very low hardness, so that the hardness thereof sometimes cannot be measured with the A-type rubber hardness tester commonly ussed in measuring the hardness of a conventional solid rubber. Accordingly, the lower limit of hardness of the rubber material in accordance with the present invention is defined by the hardness value as obtained with the F-type rubber hardness tester.

An intermediate hardness between the measuring range of the A-type rubber hardness tester and that of the F-type rubber hardness tester may be measured with a C-type rubber hardness tester. By the "C-type rubber hardness tester" is meant the one as provided in Japan Society of Rubber Industry Standard SRIS-0101, which is used in measuring such intermediate hardnesses between the measuring range of the A-type rubber hardness tester and that of the F-type rubber hardness tester. The C-type rubber hardness tester is used mostly in measuring the hardness of sponge or soft rubber. The hardness values described herein as obtained with the C-type rubber hardness tester are the values obtained with Asker C rubber hardness tester available from Kobunshi Keiki Mfg. Co., Ltd.

The hardness of the rubber material in accordance with the present invention may be measured with any of the A-, C- and F-type rubber hardness testers if the measurement is possible with any of these rubber hardness testers. However, if the hardness as measured with the A-type rubber hardness tester is not more than 1°, it is preferable to measure the hardness with the C-type or F-type rubber hardness tester because measurements with the A-type rubber hardness tester may be accompanied with increased errors. Similarly, if the hardness as measurd with the C-type rubber hardness tester is not more than 1°, it is preferable to measure the hardness with the F-type rubber hardness tester. If the hardness as measured with the C-type rubber hardness tester is not less than 99°, it is preferable to measure the hardness with the A-type rubber hardness tester. Similarly, if the hardness as measured with the F-type rubber hardness tester is not less than 99°, it is preferable to measure the hardness with the C-type or A-type rubber hardness tester. The hardness values obtained with the A-type rubber hardness tester, the C-type rubber hardness tester and the F-type rubber hardness tester will hereinafter be referred to as A hardness, C hardness and F hardness, respectively.

The cured rubber material, which has a hardness of from 30° in A hardness, preferably 20° in A hardness, more preferably 10° in A hardness to 15° in F hardness, preferably 30° in F hardness and an impact resilience of not less than 50%, preferably not less than 60%, more preferably not less than 70%, is a novel, practically useful rubber material which has not been known heretofore. In the case of conventional rubber materials adequate for practical use, those with an A hardness of not more than 30° have an impact resilience of less than 40%, for example, about 10 to 20%. It is common sense with conventional rubber materials that the impact resilience of cured rubber decreases with a decrease of its hardness. The practical rubber material of the present invention which has the specific physical properties, namely a hardness of not more than 30° in A hardness, preferably not more than 20° in A hardness, more preferably not more than 10° in A hardness, and an impact resilience of not less than 50%, preferably not less than 60%, more preferably not less than 70%, can have never been anticipated in the prior art.

The rubber material of the present invention, due to the special physical properties thereof mentioned above, is excellent in such properties as vibration-proof, sound-proof, shock-absorbing, impact-resisting and cushioning properties, and therefore can adequately be used in various ways. Thus, the uses include:

(1) Those mainly utilizing the excellent vibration-proof (vibration-isolating, vibration-absorbing or vibration-damping) property Various vibration-proof members in record players (turntable rubber sheet, vibration insulator, turntable deadening member, dust cover damper, cushion between tone arm and cabinet, cushion between head shell and arm shaft, cushion between cartridge and head shell, cushion at mounting place for motor or condenser, stabilizer for disk, cord bush, etc.); cushion at mounting place for speaker unit in speaker cabinet; vibration-proof mat for speaker, rack or the like; insulator or vibration-proof mat for precision instrument or precision apparatus such as chemical balance, vibration insulator or vibration-proof mat for stand or bench for such instrument or apparatus; vibration-proof (or sound-proof) material for use in floor, wall or the like in building or the like; vibration insulator or vibration-proof mat for radio set, television set, amplifier, tape recorder, video recorder, telephone, facsimile telegraph, teletypewriter, electronic desk computer, etc; vibration-proof member in dental equipment; vibration-proof member in handlebar of chain saw, rock drill or the like; pedal rubber of motorcycle or motorbike.

(2) Those mainly utilizing the excellent sound-proof (sound-isolating or sound-absorbing) property Sound-absorbing material in speaker cabinet; muffler for internal-combustion engine; sound-absorbing material within engine hood; sound-proof (sound-absorbing) mat for indoor or outdoor use; sound-absorbing material in vacuum cleaner; sound-absorbing material in air conditioner; sealing material for sound-proof window; sound-absorbing (sound-proof) material to be applied to windowpane.

(3) Those mainly utilizing the excellent shock-absorbing or impact-resistance property Shock absorber such as automobile bumper, fender for use on ship's side, quay wall or the like; a variety of sealing materials (e.g. for door of car, building, refrigerator or the like, for trunk compartment of car, for trunk or suitcase); shock-absorbing material in sports field (pole, fence, etc.); attachment rubber for vacuum cleaner mouthpiece; protector for use in a variety of sports; shock absorber for use in parachute descent; joint member of pipe for transport of gas, liquid, powder or the like; cord bush.

(4) Those mainly utilizing the soft and flexible feel and the excellent cushioning property Headphone ear pad; rubber eyepiece member in cathode-ray tube, camera, video recorder camera, dustproof goggles, swimming goggles, etc.; medical prosthetic material (artificial breast, artificial heel or the like); doll; figure-correcting member for use in clothes (pad for brassiere, corset, men's suit, female dress, etc.); material for making wet suit or the like; shock-absorbing heel or insole for fracture patients; material for making shoes [sole material, material for making shoes themselves (in combination use with cloth, hard rubber, etc.)]; rubber end or elbow rest of stick; cushioning material for chair, seat cushion, mattress, bed, etc.

(5) Those contributing to improvement in quality of reproduced sound in audio equipment Speaker diaphragm; structural material, interior lining or exterior lining of speaker cabinet; material of record player box; material of belt or pulley for phonomotor; interior or exterior lining of a variety of musical instruments.

(6) Other uses utilizing the low hardness and high impact resilience.

Non-puncture tire (substitute for a tube and air contained in the tube) or tube itself (solid tire with tire cover) for automobile, motorcycle, motorbike, bicycle, baby buggy, baby car, shopping cart, wheelchair, etc.; rubber caster wheel; core of golf ball; filler in oil well drilling.

(7) Other uses

Oil fence material (good in oil absorption).

The above-mentioned excellent vibration-proof, sound-proof, shock-absorbing, impact-resisting, cushioning and other properties can be exhibited only by the cured rubber having the specific physical properties, namely a hardness of from 30°, preferably 20°, more preferably 10° in A hardness to 15°, preferably 30° in F hardness and an impact resilience of not less than 50%, preferably not less than 60°, more preferably not less than 70%. Hardness and impact resilience values outside the above respective ranges are unfavorable because of poor vibration-proof, sound-proof, shock-absorbing, impact-resisting, cushioning and other properties.

The rubber material of the present invention preferably has, in addition to the above physical properties, a tensile strength of 0.1 to 100 kg./cm$^2$., more preferably 1 to 50 kg./cm$^2$., an elongation of 50 to 1,000%, more preferably 200 to 1,000%, and a specific gravity of 0.8 to 1.3, more preferably 0.89 to 1.1.

The cured rubber having the specific physical properties mentioned above can be obtained by curing a rubber composition comprising (A) 100 parts (by weight, the same hereinafter) of a rubber component, (B) 5 to 2,000 parts, preferably 50 to 2,000 parts, more preferably 100 to 2,000 parts of a factice and (C) 20 to 2,000 parts, preferably 100 to 2,000 parts, more preferably 200 to 2,000 parts of a softening agent. Such a rubber composition containing such large amounts of factice and softening agent per rubber component is a novel rubber composition hitherto unknown in the art. By curing such a novel rubber composition, there can be obtained for the first time the specific cured rubber having a hardness of from 30°, preferably 20°, more preferably 10° in A hardness to 15°, preferably 30° in F hardness and an impact resilience of not less than 50%, preferably not less than 60%, more preferably not less than 70%. For polynorbornene, it is known in the art that a cured rubber having an A hardness of about 7° can be obtained by adding a large amount of a softening agent to polynorobornene, but the cured rubber, which does not contain any factice, has an impact resilience of less than 50% and cannot be put into practical use because of intense bleeding tendency. On the contrary, in accordance with the present invention, a large amount of a factice is employed together with a large amount of a softening agent, so that bleeding can be inhibited and a practical rubber material having a low hardness and a high impact resilience respectively falling within the above-mentioned specific ranges can be obtained. Moreover, it has now been found that such cured rubber is excellent in vibration-proof, sound-proof, shock-absorbing, cushioning and other properties, and the material has further specific properties such that it is best suited as a material for making the speaker diaphargm (reproducing extremely low-pitched sounds and sounding sounds), that it is crushed to pieces upon receiving an excessive impact force (advantageous in use as a bumper material), and that it can be used as a substitute for tube and air in tire.

The rubber component (A) is not particularly limited. There are exemplified rubber components composed predominantly of one or more members of polynorbornene, natural rubber, isoprene rubber, chloroprene rubber, styrene-butadiene rubber, butadiene rubber, butyl rubber, ethylene-propylene rubber, ethylene-propylene-diene rubber, nitrile rubber, acrylic rubber, urethane rubber, chlorinated polyethylene, chlorosulfonated polyethylene, epichlorohydrin rubber, polysulfide rubber, silicone rubber and the like. Regenerated products (e.g. rubber powder) therefrom are also included. The rubber component may be either in solid form (e.g. powder, pellets, blocks, sheets) or in liquid form (e.g. liquid rubber, latex). Among the above exemplified rubber components, the preferred is a rubber component predominantly composed of polynorbornene, the content of polynorbornene being preferably not less than 50% (percent by weight, the same hereinafter), more preferably not less than 65%, based on the whole rubber component.

The factice as the component (B) includes a variety of factices, for example, white factice, black factice, amber factice and blue factice, which are prepared by vulcanizing various vegetable oils including linseed oil, rapeseed oil, soybean oil, sesame oil, tung oil and castor oil with sulfur or sulfur chloride. Those factices may be used either alone or in combination. Especially preferred is a factice obtainable by vulcanization of rapeseed oil.

The softening agent as the component (C) includes oils, plasticizers and other agents having a softening activity. The oils incude those commonly used as extender oils (softening oils, process oils, etc.) for rubbers, such as aromatic oils, naphthenic oils, paraffinic oils, vegetable oils and animal oils. Examples of the vegetable and animal oils are castor oil, rapeseed oil, linseed oil, whale oil and fish oil. As plasticizers, there may be used those having a greater solftening capacity among usual plasticizers, for example, dibutyl phthalate, dioctyl phthalate and dioctyl sebacate. Other usable softening agents include liquid rubbers and the like. The softening agents mentioned above may be used either alone or in combination of two or more. Use of an oil alone or a combined use of an oil and a plasticizer is generally preferred.

The above-mentioned rubber composition may also contain, besides the components (A) to (C), other usual rubber additives such as filler (e.g. carbon black, zinc oxide), colorant, lubricant (e.g. stearic acid) and antioxidant in such an amount that the above-mentioned physical properties are not impaired.

Curing of the above rubber composition can be carried out with any of usual curing systems. Sulfur curing or sulfurless curing may be adopted. The curing conditions are not critical, hence usual conditions may be used.

A typical example of the above rubber composition, which is suited for sulfur curing, is as follows:

| (Component) | (Parts) |
| --- | --- |
| Rubber component | 100 |
| Factice | 100 to 2,000 |
| Softening agent | 200 to 2,000 |
| Filler | 1 to 100 |
| Antioxidant | 0.5 to 6 |
| Sulfur | 0.5 to 10 |
| Curing accelerator | 1 to 20 |

For making the rubber material of the present invention adequate for a specific use, the above-mentioned rubber composition is cured in a shape adequate for the use in the same manner as in producing usual rubber moldings. For example, the rubber composition may be either press-cured directly in a mold having a cavity of the desired shape and dimensions, or first formed into an uncured molding, for example, by calendering or extrusion, followed by press- or steam-curing of the molding. Injection molding is also possible.

Some specific uses of the rubber material of the present invention are illustrated in the following:

(1) Vibration-proof material

In cases where the rubber material of the present invention is used as a vibration-proof material for use in vibration-proof members such as rubber sheet for turntable, vibration insulator (vibration-proof rubber foot) and vibration-proof mat, the shape thereof is not particularly limited. However, a shape having a large number of projections on a face thereof which will come into contact with other member, preferably projections capable of contacting other member substantially at points or along lines, is preferred. Such a shape reduces the contact area with the other member and also causes involvement of air layer among the projections, so that an enhanced vibration-proof effect can be obtained as a result of synergism of the air layer and the rubber material of the present invention which has the above-mentioned specific properties.

The shape of the projections is not particularly limited, hence various shapes can be employed. However, from the viewpoint of reducing the contact area with the other member as much as possible, such a shape that the area of the head of each projection is as small as possible is preferable. An embodiment of such a projection has a shape wherein at least the head of the projection is ridge-shaped so as to allow substantially linear contact with the other member. The projection according to this embodiment includes a roof-shaped one, one having a semicircular section and one with a knife edge-shaped head, the last-mentioned one being especially preferred. Another preferable embodiment has a shape wherein at least the head of the projection is pointed so as to allow substantially point contact with the other member. In accordance with this embodiment, the projection has shapes such as a pyramid (which includes a triangular pyramid, a quadrangular pyramid and other polygonal pyramids, the same hereinafter), a cone (which includes an elliptic cone, the same hereinafter), a dome (which includes an almost spherical one, a semispherical one, a circular cylinder with a rounded head, etc., the same hereinafter). A projection having a sharp head like a needle is particularly preferred. In the above-mentioned two embodiments, the only requirement is that at least the head of the projection is ridge-shaped or pointed, and the shape of the base thereof is not particularly limited. For example, the projection may have a shape comprising a base having the shape of a truncated pyramid, a truncated cone or the like and a head mounted thereon, the shape of which is, for instance, roof-like, semicircular in section, pyramidal, conical or dome-like. Other shapes than the above-mentioned ones may also be used as long as the contact area with other member is allowed as small as possible. For example, truncated pyramidal, truncated conical, pillar-shaped or column-shaped projections may be used. Furthermore, those projections may have at the top thereof a recess or notch which will ensure line or point contact.

The contact area between a projection-bearing face and an other member is preferably 0.01 to 10%, more preferably 0.01 to 1%, of the contact area between the face and the other element, provided that the face is provided with no projections.

The height of the projection is preferably 0.1 to 5 mm., more preferably 0.3 to 2 mm.

The projections may be disposed either at random or regularly on the face of the vibration-proof member which comes into contact with an other member. Regular disposition may be carried out in the form of concentric circles (which include concentric ellipses, concentric polygons, and the like, the same hereinafter), volute, radial lines, latticework or straight lines, etc. The individual projections may be disposed either at adequate intervals or in close contact with one another. A combination of these manners of disposition may also be used. When the projections are disposed in close contact with one another, the adjacent projections may be connected integrally with each other at the bases thereof. A preferred manner of disposition is such that the projections are arranged in close contact with one another in the form of concentric circles so that air can be held in spaces defined by the arrays of the projections and an other member which will come into contact with the vibration-proof member. Such disposition produces a more improved vibration-proof effect.

The projections as mentioned above may be produced integrally with the body of the vibration-proof member, or they may be produced separately and then attached to the body by means such as adhesion.

The vibration-proof member in accordance with the present invention is provided with the above-mentioned projections on at least one face out of a plurality of faces which will possibly come into contact with other members, although all the faces may be provided with the projections. The shape of other contact face of the vibration-proof member with the other member is not particularly limited. Thus, the face may be completely flat or be provided with concentrically circular, vortical, radial, lattice-like or rectilinear grooves or ribs, or the like. The face may also be provided with concavities or protrusions having a circular or polygonal shape or the like in plan view and disposed regularly (e.g. in the form of concentric circles, volute, radial lines, lattice-work or straight lines) or at random.

The vibration-proof member in accordance with the present invention will be explained hereinafter by referring to three vibration insulators each provided with the above-mentioned projections.

The first vibration insulator is an insulator comprising a sheet-like or pillar-like body made of the rubber material of the present invention, the body being provided with a large number of projections on at least one face out of a plurality of faces thereof which will possibly come into contact with other members. Hereinafter such insulator is referred to as insulator (I).

Figure 2:
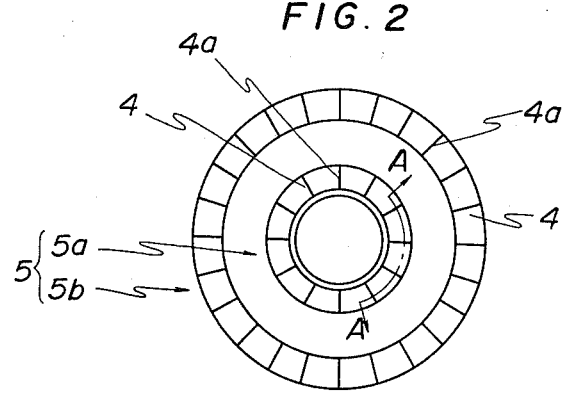
FIG. 2 is a plan view thereof.
Figure 3:
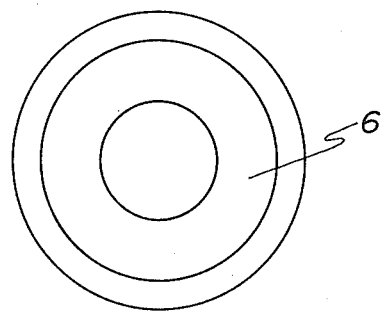
FIG. 3 is a plan view of the reverse side and FIG. 4 is an enlarged cross-sectional view taken along the line A—A in FIG. 2.

The insulator (I) is illustrated referring to the drawings. FIG. 1 is a vertical cross-sectional view showing an example of the insulator (I), FIG. 2 is a plan view thereof, and FIG. 3 is a plan view of the reverse side. The insulator of this example can be used as an insulator for supporting record player, speaker cabinet, a variety of measuring instruments, etc. Generally, it is interposed between such equipment or instrument and the surface for placement thereof.

In FIGS. 1 to 3, numeral 1 is a sheet-like body made of the rubber material of the present invention. That face of the body 1 which is to come into contact with an other member 2 to be supported by the insulator, such as record player is provided with a large number of projections 4.

In the insulator having the above construction, the body 1 is made of the rubber material of the present invention, which has an excellent vibration-absorbing property, and in addition a large number of projections 4 are disposed on the contact face of the body 1 with the other member 2 so that the real contact surface area is reduced to a great extent and at the same time an air layer is interposed between the body 1 and the other member 2 by the presence of the projections 4. Thus, the transmission of outside vibration to the other member 2 supported by the insulator is sufficiently interrupted and as a result, an excellent vibration-proof effect is produced.

In the insulator (I), the projections 4 may have any of the shapes mentioned above. However, the preferred is a shape wherein at least the head of each projection is ridge-shaped so as to allow substantially linear contact with the other member 2 to be supported and a shape wherein at least the head of each projection is pointed so as to allow substantially point contact with the other member 2 to be supported.

Figure 4:
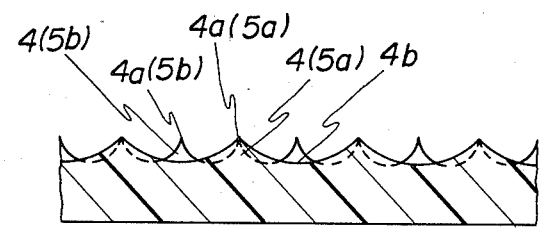
Figure 5:
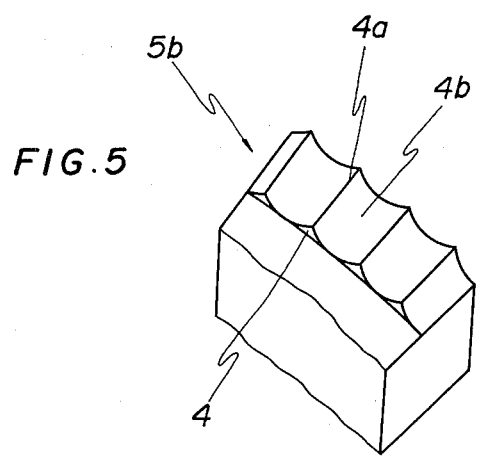
FIG. 5 is an enlarged partial perspective view of one array of projections.

In the embodiment shown in FIGS. 1 to 3, each projection 4 is a ridge-shaped one which is knife edge-shaped at the head and gradually widened toward the base. The embodiment is an example wherein projections having such a ridge shape are disposed on a circular plane. Such a ridge-shaped projection is preferable as the projection in accordance with the present invention, and a projection of this kind is hereinafter referred to as projection 4, unless noted otherwise. The ridge-shaped projections 4 are arranged closely adjacent with one another so as to form concentric circles and thereby constitute arrays 5 (5a and 5b) of projections. FIG. 4 is an enlarged cross-sectional view taken along the line A—A in FIG. 2 and developed on a plane, and FIG. 5 is an enlarged partial perspective view of the projection array 5b.

Figure 6:
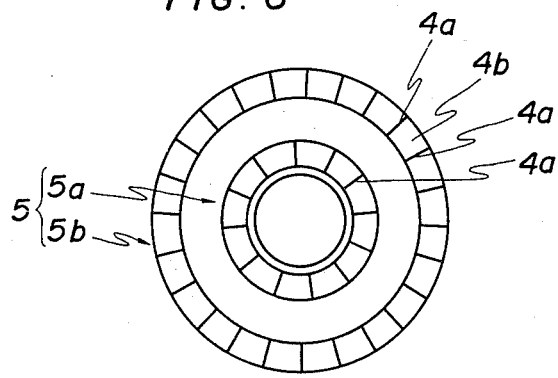
FIG. 6 is a plan view illustrating another example of the mode of arrangement of projections.
Figure 7:
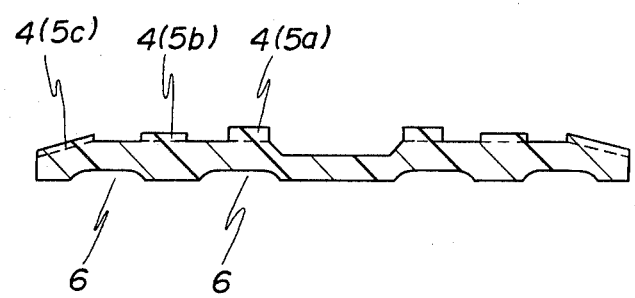
FIG. 7 is a vertical cross-sectional view of a vibration insulator wherein the height of projections is varied depending on the array to which the projections belong.

In disposing the ridge-shaped projections 4 in concentric circles, the projections are generally arranged, as indicated in FIG. 2, in such a manner that the direction of each ridgeline 4a is equal to that of the respective radius of the circle. In this case, as shown in FIGS. 2 and 4, the ridgeline 4a of each projection 4 in one projection array 5a and that of the corresponding projection 4 in another array 5b may be on the same radius, or, as shown in FIG. 6, they are not on the same radius but the ridgeline 4a of each projection 4 in one projection array 5a may correspond in the direction of the radius of the circle to a valley 4b between two adjacent projections 4 in another projection array 5b. Generally, the projections 4 are flush at the tops (4a) thereof with one another. However, such arrangement is not always necessary. Thus, for example, as shown in FIG. 7, an arrangement is possible such that the projections 4 in the most inner array 5a are highest and the projections 4 in arrays 5b and 5c are lower stepwise in that order. An arrangement in a converse manner is also possible. With such arrangements, when the other member 2 supported by the insulator is light in weight, only those projections 4 that belong to the array 5a (or the array 5c) come into contact with the other member 2, so that the contact area can be more reduced. As the weight of the other member 2 increases, the projections 4 belonging to the array 5b and then those belonging to the array 5c (or the array 5a) come into contact with the other member 2. Furthermore, various other arrangements may be employed. For example, the projections 4 in the array 5b may be the highest or lowest. The number of the projections 4 and the number of projection arrays 5 are not critical. The only requirement is that the projections 4 can support the other member 2 at their heads. Thus, for example, in the case of a small-sized insulator, a single projection array may be sufficient.

The edge portion of the body 1 may be even with the central portion, as shown in FIG. 1, or may descend toward the edge, as shown in FIG. 7. In the latter embodiment, the tensile strength of the rubber material is killed owing to the fact that the edge portion is relatively thin, so that closer contact of the body 1 with a surface 3 on which the insulator is placed can be established. In the embodiment shown in FIG. 7, the slanting edge portion is provided with a projection array 5c, although said portion may be free of a projection array.

The shape of that face of the body 1 which is to come into contact with the placement surface 3 is not particularly limited. Thus, the face may be completely flat or may be provided with projections 4 similar to those on the face in contact with the other member 2. In a preferred embodiment, the face is provided with one or more concentric grooves 6, as shown in FIG. 3 and FIG. 7. In this embodiment, air is tightly held within the grooves 6, so that a more improved vibration-proof effect can be produced as a result of synergism of the air and the projections 4 on the face in contact with the other member 2. Conversely, the face in contact with the placement surface 3 may be provided with projections 4 and the face in contact with the other member 2 with concentric grooves 6.

Figure 8:
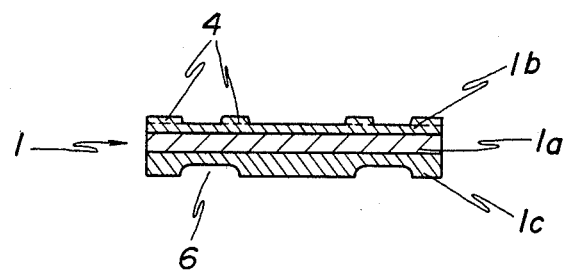
FIG. 8 is a vertical cross-sectional view of a vibration insulator, the body of which has a laminated structure comprising a plurality of rubber materials different in physical properties.

The body 1 may be a thin sheet with a thickness of about 1 mm. to about 5 mm. Even such a thin body can produce an excellent vibration-proof effect due to the previously mentioned specific physical properties of the rubber material used and the above-mentioned specific shape, as compared with conventional insulators. It is not always necessary that the body 1 is composed of single rubber material. Thus, for example, as shown in FIG. 8, it is possible that the portion 1a is composed of a rubber material having an A hardness of 1° and the portion is sandwiched by two portions 1b and 1c each composed of a rubber material having an A hardness of 9°.

The shape in plan view of the body 1 is not limited to a circle as shown in FIGS. 2 and 3, but may be any of various shapes including an ellipse and a polygon (which includes triangle, quadrangle, pentagon, hexagon and other polygons, the same hereinafter). The body 1 may have a shape other than a sheet-like one. It may have any of various pillar-like or column-like shapes, including cylinder, elliptic cylinder, polygonal cylinder, truncated cone, truncated polygonal pyramid, etc. The body 1 shown in FIG. 9 is a cylinder which has projections 4 on its face in contact with the other member 2 and a concavity 6a on its face in contact with the placement surface 3.

Figure 10:
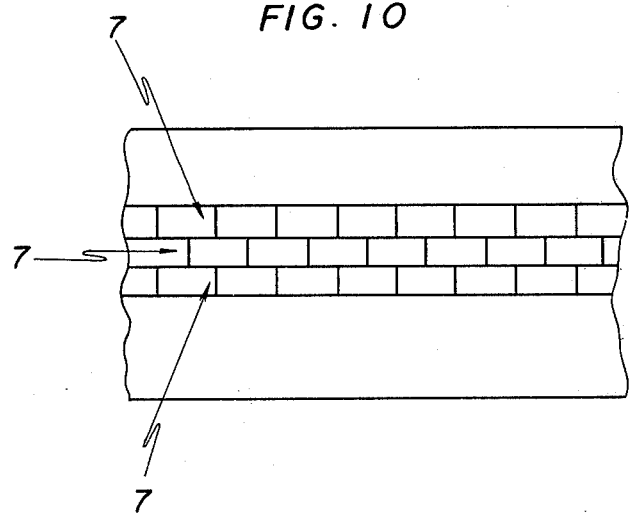
FIG. 10 is a developed view illustrating an example of the mode of arrangement of projections provided on the side face of the cylindrical body.

The side face of the cylindrical body 1 may be provided with projections 7 similar to the projections 4. FIG. 10 shows an example of arrangement of the projections 7, the figure corresponding to a developed view of the side face of the body 1. The projections 7 serve in patterning as well as in reinforcing the side portion of the cylindrical body 1. When the side face of the body 1 also comes into contact with the other member 2, the projections 7 play the same role as the above-mentioned projections 4. For increasing the strength of the side portion of the cylindrical body 1, it is also possible to provide the body 1 with a ring-shaped band made of a usual hard rubber, a synthetic resin or a metal and surrounding the body 1, instead of the projections 7.

Figure 9:
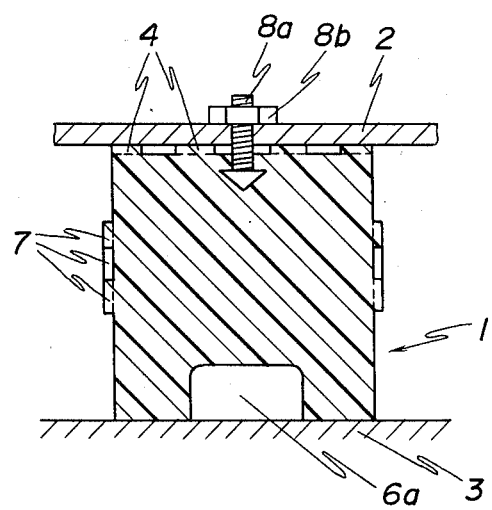
FIG. 9 is a vertical cross-sectional view illustrating a vibration insulator, the body of which is cylindrical.
Figure 11:
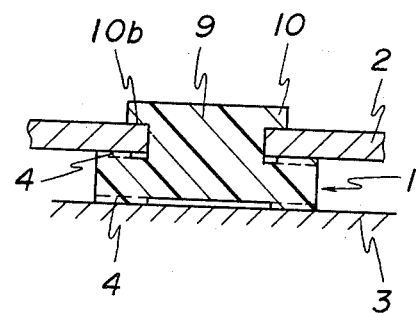
FIG. 11 is a vertical cross-sectional view of a vibration insulator which can be attached to an other member to be supported by insertion and FIG. 12 is a plan view thereof.
Figure 12:
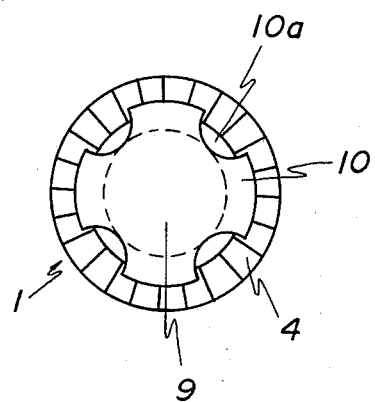

The insulator (I) may merely be interposed between the other member 2 and the placement surface 3, as shown in FIG. 1, or it may be fixed to the other member 2 through a fixing means such as an embedded bolt 8a and a nut 8b, as shown in FIG. 9. Furthermore, as shown in FIGS. 11 and 12, attachment by insertion is also possible. FIG. 11 is a vertical cross-sectional view showing an example of the insulator (I) of the insertion type, and FIG. 12 is a plan view thereof. In this embodiment, the body 1 has a protrusion 9 on the upper face, and the protrusion 9 has a flange portion 10. The flange portion 10 has recesses 10a so that the protrusion 9 with the flange portion 10 can easily be inserted into a hole made in the other member 2 to be supported. However, the recesses 10a may be omitted. The flange portion 10 may be provided with projections 4 on the lower face 10b thereof. In cases where the upper face of the protrusion 9 also comes into contact with the other member 2, the upper face may be provided with projections 4.

Figure 13:
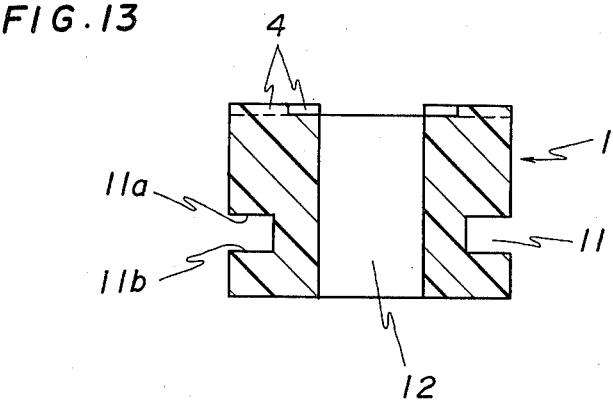
FIG. 13 is a vertical cross-sectional view of a vibration insulator usable as a cushion, for instance, employed at the mounting place for a motor in a record player.
Figure 14:
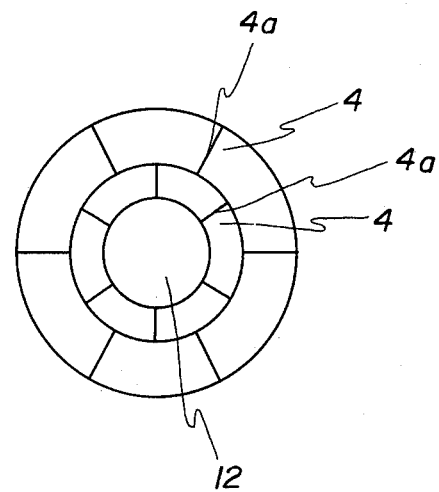
FIG. 14 is a plan view thereof and FIG. 15 is a vertical cross-sectional view illustrating the manner of attachment of the insulator shown in FIGS. 13 to 14.
Figure 15:
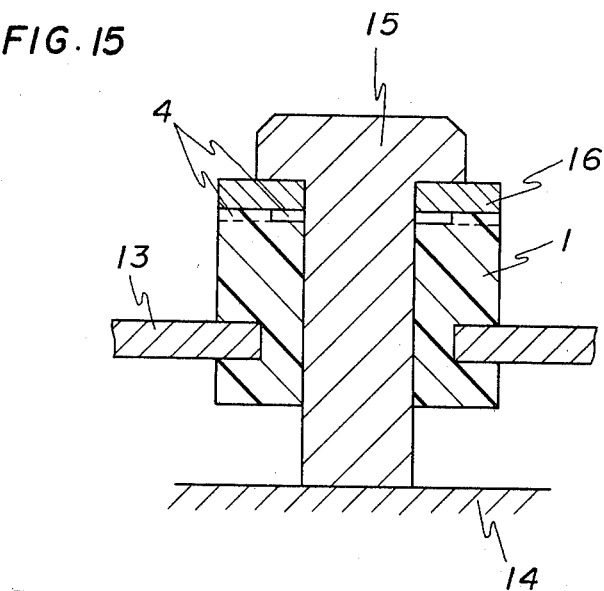

FIG. 13 is a vertical cross-sectional view illustrating another example of the insulator (I), FIG. 14 is a plan view thereof and FIG. 15 is a vertical cross-sectional view showing a manner of attachment thereof. The insulator in accordance with this embodiment is useful as cushion at the mounting place for a motor or condenser in a record player.

In FIGS. 13 to 15, a cylindrical body 1 is provided with an annular groove 11 formed on the side face thereof and with a hole 12 passing through the central part thereof. Projections 4 are disposed on the upper face of the body 1. The body 1 is constructed so that it can be attached to a supporting plate 13 by insertion in a hole in the plate and the edge of the hole in the supporting plate 13 is engaged with the annular groove 11 on the side of the body 1. A hanging bolt 15 is inserted in the hole 12 in the body 1, and a motor 14 is fixedly connected to the bolt. A packing indicated by numeral 16 is in contact with the projections 4 on the upper face of the body 1.

The upper face 11a and/or the lower face 11b of the annular groove 11, which is in contact with the supporting plate 13, may be provided with projections 4. Similarly, the inside face of the hole 12 in which the hanging bolt 15 is inserted may be provided with projections 7.

In case the body 1 is sheet-like and great in area, the insulator (I) may be used not only as a vibration-proof rubber foot but also as a vibration-proof mat.

The second vibration insulator comprises a first vibration-proof member which comes in contact with a surface on which the insulator is placed and is composed of the rubber material of the present invention, and a second vibration-proof member which comes in contact with an other member to be supported by the insulator and is composed of the rubber material of the present invention. The first vibration-proof member has an opening on the upper face thereof and contains a hollow cavity expanded as compared with the opening, and the second vibration-proof member has a protrusion having a shape which corresponds to that of the hollow cavity, the protrusion of the second vibration-proof member thus being inserted in the hollow cavity of the first vibration-proof member. The contact between the first vibration-proof member and the second vibration-proof member is established through a large number of projections provided either on the surface of the hollow cavity in the first vibration-proof member or on the surface of the protrusion of the second vibration-proof member. The first vibration-proof member is provided with a large number of projections on the face in contact with the surface for placement of the insulator. Such insulator is hereinafter referred to as insulator (II).

Figure 16:
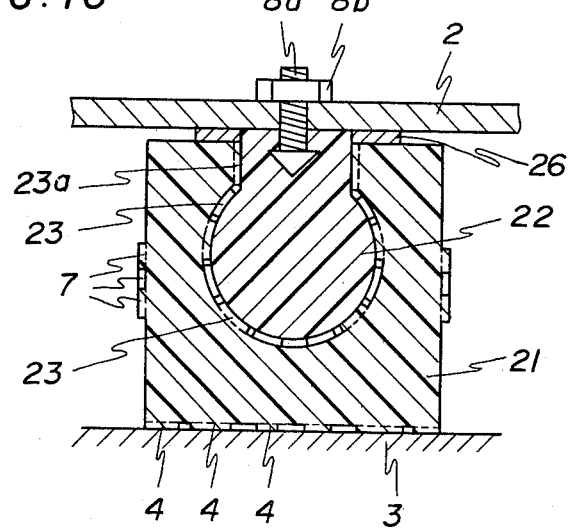
FIG. 16 is a vertical cross-sectional view of another example of the vibration insulator wherein the rubber material of the present invention is used and FIG. 17 is a plan view thereof.
Figure 17:
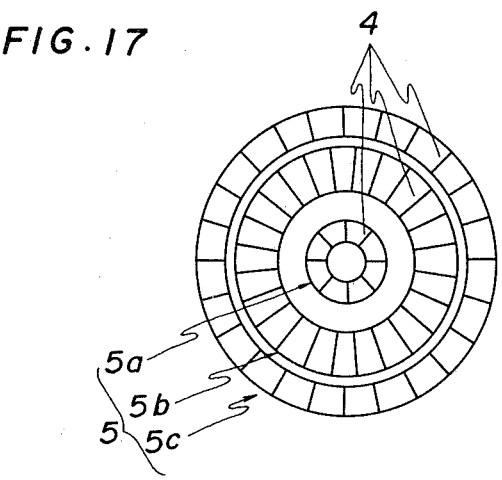
Figure 18:
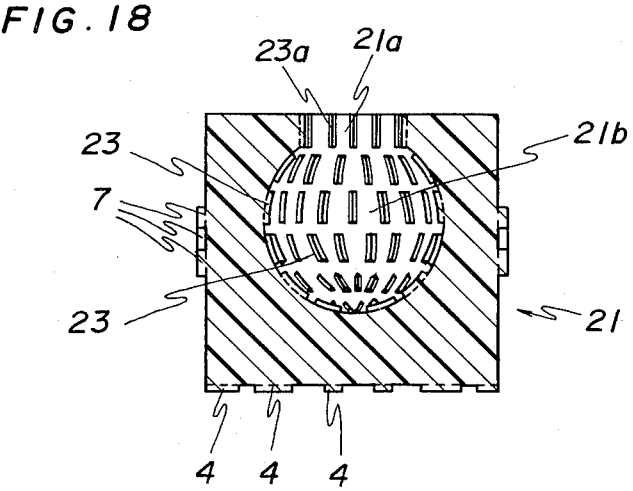
FIG. 18 is a vertical cross-sectional view of the first vibration-proof member of the insulator shown in FIGS. 16 to 17.
Figure 19:
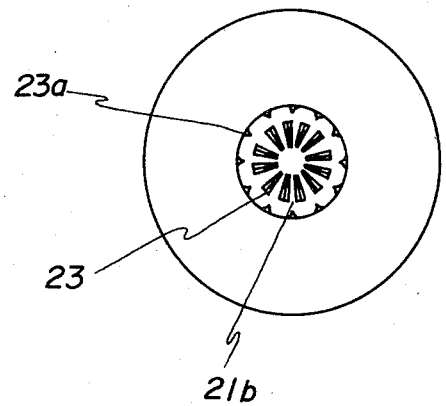
FIG. 19 is a plan view of the first vibration-proof member.
Figure 20:
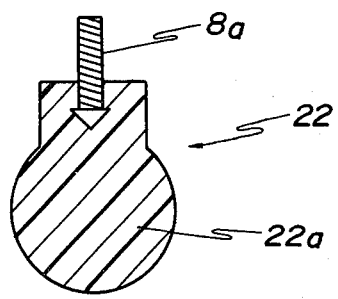
FIG. 20 is a vertical cross-sectional view of the secnd vibration-proof member and FIG. 21 is a plan view of the second vibration-proof member.
Figure 21:
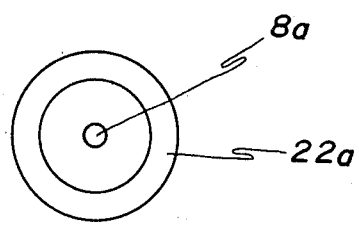

Referring to the drawings, the insulator (II) will be illustrated. FIG. 16 is a vertical cross-sectional view showing an example of the insulator (II) and FIG. 17 is a plan view of the bottom thereof. In FIGS. 16 and 17, numeral 21 is the first vibration-proof member, and numeral 22 is the second vibration-proof member. The vibration-proof members 21 and 22 are each composed of the rubber material of the present invention. FIG. 18 is a vertical cross-sectional view of the vibration-proof member 21 and FIG. 19 is a plan view thereof. FIG. 20 is a vertical cross-sectional view of the vibration-proof member 22 and FIG. 21 is a plan view thereof.

The vibration-proof member 21 has an opening 21a on the upper face thereof and contains a hollow cavity 21b expanded as compared with the opening. The surface of the hollow cavity 21b is provided with a large number of projections 23. The vibration-proof member 21 is also provided with a large number of projections 4 on the face in contact with the surface 3 for placement of the insulator. The vibration-proof member 22 has a protrusion 22a which has a shape corresponding to that of the hollow cavity 21b in the vibration-proof member 21. The protrusion 22a of the vibration-proof member 22 is inserted under pressure into the hollow cavity 21b in the vibration-proof member 21. The vibration-proof member 21 and the vibration-proof member 22 are in contact with each other only through the heads of the projections 23 disposed on the surface of the hollow cavity 21b. The above-mentioned insulator is constructed so that it is fixedly attached to an other member 2 to be supported, by means of a bolt 8a embedded in the vibration-proof member 22 and a nut 8b.

In the insulator (II) having the above-mentioned construction, transmission of outside vibrations to the other member 2 is inhibited to a satisfactory extent and an excellent vibration-proof effect is produced, since the rubber material of the present invention is used in each of the vibration-proof member 21 in contact with the surface 3 for placement of the insulator and the vibration-proof member 22 in contact with the other member 2 and further the contact area between the vibration-proof member 21 and the vibration-proof member 22 is reduced by means of the projections 23 and at the same time the contact area between the vibration-proof member 21 and the placement surface 3 is reduced by means of the projections 4.

In the insulator (II), the projections 23, which are provided for the purpose of reducing the contact area between the vibration-proof member 21 and the vibration-proof member 22, may be disposed either on the surface of the hollow cavity 21b in the vibration-proof member 21, as in the example shown in FIGS. 16 to 21, or on the surface of the protrusion 22a of the vibration-proof member 22. It is also possible to provide them on both the surfaces.

In the insulator (II), the projections 4 provided on that face of the vibration-proof member 21 which comes into contact with the placement surface 3 may be similar to the projections 4 in the insulator (I), and the arrangement thereof may also be similar to that in the insulator (I). For instance, the projections 4 in the example shown in FIGS. 16 to 21 are ridge-shaped and each has a knife edge-shaped head and a widened base. In the example, such ridge-shaped projections are disposed in a circular plane. The ridge-shaped projections 4 are disposed in concentric circles, so that they constitute projection arrays 5 (5a, 5b and 5c).

The shape of the projections 23 in the insulator (II) may be similar to that of the projections 4 in the insulator (I), and the arrangement thereof may also be similar to that in the insulator (I) except that the arrangement surface is a curved surface.

In the insulator (II), the rubber material of the present invention used in the vibration-proof member 21 and that used in the vibration-proof member 22 may have either the same physical properties or different physical properties. For example, an embodiment may be mentioned wherein a rubber material having an A hardness of 1° is used for the vibration-proof member 21 and a rubber material having an A hardness of 8° is used for the vibration-proof member 22. Such use of rubber materials different in hardness in the vibration-proof member 21 and the vibration-proof member 22 is advantageous in that a more improved vibration-proof effect can be produced against a finer vibration.

Figure 22:
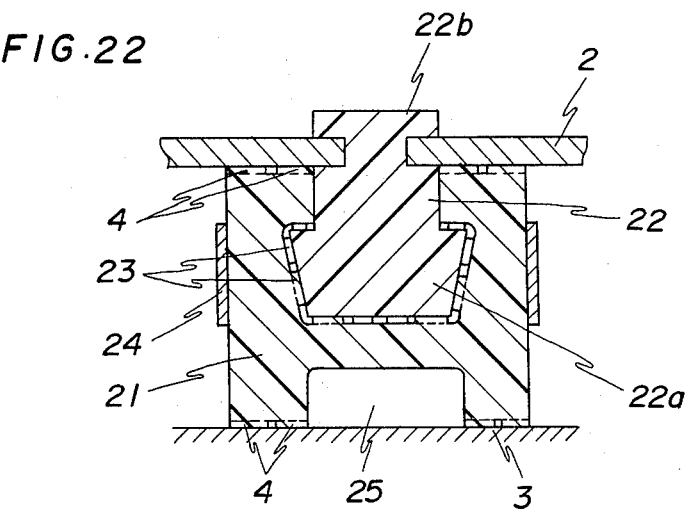
FIG. 22 is a vertical cross-sectional view illustrating a modification of the insulator shown in FIGS. 16 to 21.

The vibration-proof member 21 in the insulator (II) may be similar in shape to the pillar- or column-shaped body 1 in the insulator (I) except that the member 21 contains a hollow cavity. The vibration-proof member 21 may be provided with projections 7 on the side face thereof as in the case of the insulator (I). It is also possible, as shown in FIG. 22, to provide the member 21 with a ring-shaped band 24 surrounding the member and composed of a usual hard rubber, a synthetic resin or a metal, instead of the projections 7. When the upper face of the vibration-proof member 21 comes into direct contact with the other member 2, the upper face of the vibration-proof member 21 may be provided with projections 4, as shown in FIG. 22, in a similar manner as in the case of the face in contact with the placement surface 3. The face of the vibration-proof member 21 in contact with the placement surface 3 may be further provided with a concavity 25.

The shape of the protrusion 22a of the vibration-proof member 22 is not particularly limited. The shape includes a spherical one as shown in FIGS. 16, 20 and 21, a truncated cone as shown in FIG. 22, and other various shapes such as hemisphere, cylinder, polygonal prism, cone and polygonal pyramid. The shape of the hollow cavity 21b in the vibration-proof member 21 is made to substantially correspond to the shape of the protrusion 22a of the vibration-proof member 22.

In the insulator (II), it is preferred that the space between the wall of the hollow cavity 21b in the vibration-proof member 21 and the protrusion 22a of the vibration-proof member 22 is kept air-tight, whereby entrance and exit of air is prohibited. Such a condition can bring about a more improved vibration-proof effect. As an example of the means for keeping the space airtight, there may be mentioned use of a sealing member 26 capable of tightly coming in contact wiith the upper side face of the vibration-proof member 22, as shown in FIG. 16, for the case in which projections 23a are disposed on the wall of the opening 21a of the vibration-proof member 21 (or at that part of the vibration-proof member 22 which faces the wall of the opening 21a), as shown in FIGS. 16, 18 and 19. When such projections 23a are not provided on the wall of the opening 21a of the vibration-proof member 21 (or at that part of the vibration-proof member 22 which faces the wall of the opening 21a), it is sufficient that the wall of the opening 21a of the vibration-proof member 21 and that face of the vibration-proof member 22 which faces the wall of the opening 21a can come into close contact with each other.

The means by which the insulator (II) is attached to the other member 2 is not critial, but includes the use of an embedded bolt 8a and a nut 8b, as shown in FIG. 16, and insertion of the head portion 22b of the vibration-proof member 22 into a hole made in the other member 2, as shown in FIG. 22.

The third vibration insulator comprises a core member, a first vibration-proof member disposed on the core member and coming into contact with an other member to be supported by the insulator, which vibration-proof member is composed of the rubber material of the present invention, and a second vibration-proof member disposed under the core member and coming into contact with a surface on which the insulator is placed, which second vibration-proof member is composed of the rubber material of the present invention, and that face of the second vibration-proof member which comes into contact with the placement surface and/or that face of the first vibration-proof member which comes into contact with the other member to be supported being provided with a large number of projections. Such insulator is hereinafter referred to as insulator (III).

Figure 23:
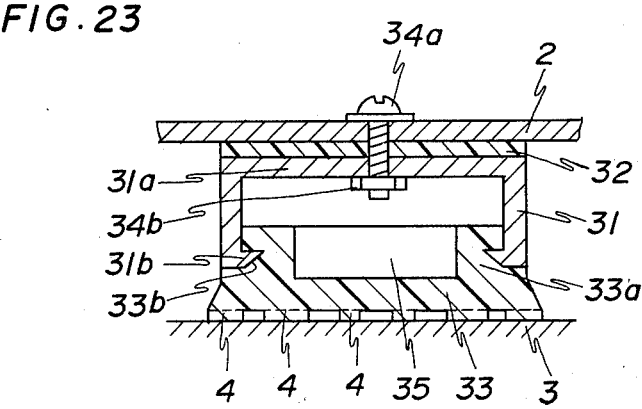
FIG. 23 is a vertical cross-sectional view illustrating still another example of the vibration insulator wherein the rubber material of the present invention is used and FIG. 24 is a plan view of the bottom thereof.
Figure 24:
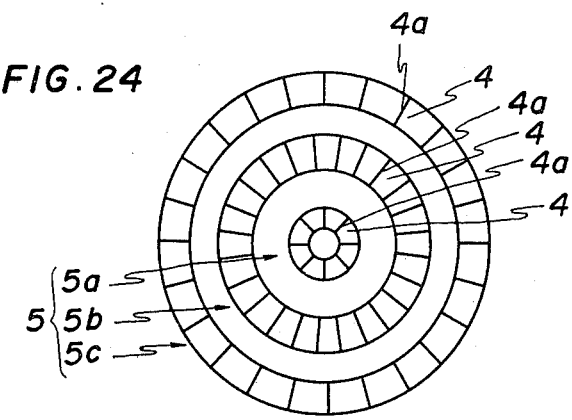

Referring to the drawings, the insulator (III) will now be illustrated. FIG. 23 is a vertical cross-sectional view of an embodiment of the insulator (III), and FIG. 24 is a plan view of the bottom thereof. In FIGS. 23 and 24, numeral 31 is a core member, numeral 32 is a first vibration-proof member disposed on the core member 31. The vibration-proof member 32 is to come into contact with an other member 2 to be supported by the insulator, for example, a record player. A member indicated by numeral 33 is a second vibration-proof member disposed under the core member 31 and is to come into contact with a placement surface 3 for the insulator. The vibration-proof members 32 and 33 are each composed of the rubber material of the present invention.

The core member 31 is a hollow body having a top plate 31a and provided with an annular protrusion 31b on the inside wall of the lower end. The protrusion 31b has a shape in section such as wedge, rectangle or semicircular shape. On the other hand, the upper face of the vibration-proof member 33 is provided with a cylindrical portion 33a. The outer side face of the cylindrical portion 33a has an annular recess 33b which corresponds in shape to the annular protrusion 31b of the core member 31, so that the vibration-proof member 33 is attached to the core member 31 by insertion. The vibration-proof member 32 is flat and is either merely placed on the core member 31 or fixed thereto by adhesion. The vibration-proof member 33 is provided with a large number of projections 4 disposed on the face in contact with the placement surface 3. The above-mentioned insulator is attached to the other member 2 by means of a bolt 34a and a nut 34b.

In the insulator (III) having the above-mentioned construction, transmission of outside vibrations to the other member 2 is inhibited to a satisfactory extent and an excellent vibration-proof effect is produced, since the rubber material of the present invention which is excellent in vibration-absorbing property is used in each of that portion of the insulator which comes into contact with the placement surface 3 and that portion which comes into contact with the supported other member 2 and at the same time a large number of projections 4 are disposed on that face of the vibration-proof member 33 which comes into contact with the placement surface 3 so that the contact area between the insulator and the placement surface 3 is much reduced.

In the insulator (III), the projections 4 disposed on that face of the vibration-proof member 33 which comes into contact with the placement surface 3 may be similar to the projections 4 in the insulator (I), and they may be arranged in a manner similar to that described for the insulator (I). For example, in an embodiment shown in FIGS. 23 and 24, each projection 4 is ridge-shaped and has a knife edge-shaped head 4a and a widened base. In the embodiment, such ridge-shaped projections are disposed on a circular plane. Thus, the ridge-shaped projections 4 are arranged in concentric circles, forming projection arrays 5 (5a, 5b and 5c).

The rubber material of the present invention used in the vibration-proof member 32 and that used in the vibration-proof member 33 may be the same or different in physical properties. For example, there may be mentioned an embodiment wherein a rubber material having an A hardness of 8° is used for the vibration-proof member 32 and a rubber material having an A hardness of 1° is used for the vibration-proof member 33.

The shape of the core member 31 is not critical. For instance, it may be a solid cylinder or prism. However, a hollow body having a top plate 31a as shown in FIG. 23 is usually preferred. The hollow body may be, for instance, a hollow cylinder or a hollow polygonal prism, the former being usually preferred. By closing the hollow core member 31 at the bottom opening thereof with the vibration-proof member 33, air is confined and tightly kept in the inside space 35, and the air further increases the vibration-proof effect. The material of the core member 31 is not particularly limited. The only requirement is that the material has a sufficient rigidity to resist the weight of the other member 2 without any undue deformation. Thus, the usable material includes hard rubbers, synthetic resins such as hard polyvinyl chloride and ABS (acrylonitrile-butadiene-styrene) resin, and metals such as iron and aluminum alloy. Among these, hard rubbers are especially preferred. When a hard rubber is used, an air cushion is formed as a result of contribution of the air sealed within the inside space 35 and elasticity of the hard rubber, so that a more favorable vibration-proof effect is produced.

Figure 25:
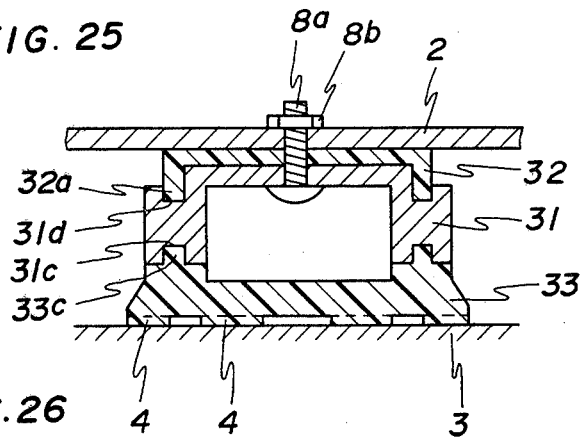
FIGS. 25 and 26 are vertical cross-sectional views respectively illustrating modifications of the insulator shown in FIGS. 23 to 24.

The means for attaching the vibration-proof member 33 to the core member 31 is not critical. Various means other than that described in reference to the above embodiment may also be employed. For instance, in an example shown in FIG. 25, the core member 31 is provided with an annular groove 31c on the bottom face thereof, whereas the vibration-proof member 33 is provided on the upper face thereof with an annular protrusion 33c which corresponds to the above-mentioned annular groove 31c, so that attachment by insertion is possible. The means of attachment as illustrated in FIG. 23 may be simplified by omitting both the annular protrusion 31b of the core member 31 and the annular recess 33b of the vibration-proof member 33. Furthermore, the vibration-proof member 33 may be attached to the core member 31 by such means as adhesion, without using such means for attachment by insertion as mentioned above. That portion of the vibration-proof member 33 which carries the load of the other member 2 via the core member 31 preferably has a greater thickness than that of the central portion thereof, as shown in FIG. 23 and FIG. 25.

The means for attaching the vibration-proof member 32 to the core member 31 is not particualrly limited. It may be sufficient that the member 32 is merely placed on the upper face of the core member 31, as shown in FIG. 23. Attachment by insertion is possible when the core member 31 is provided on the upper face thereof with an annular groove 31d and at the same time an annular protrusion 32a is formed by bending the edge portion of the vibration-proof member 32 so as to correspond to the above-mentioned annular groove 31d, as shown in FIG. 25.

Figure 26:
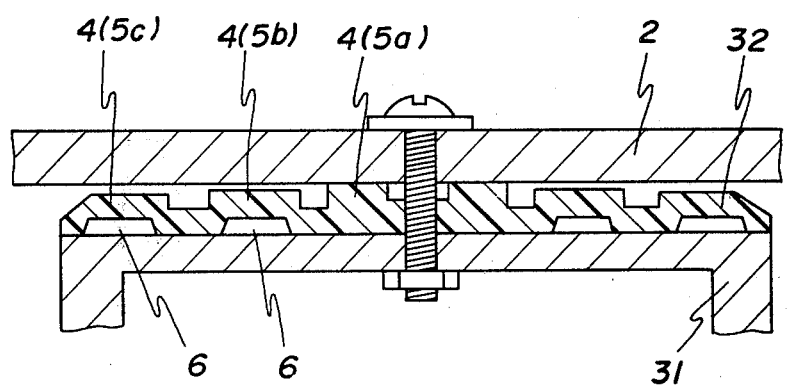

In the insulator (III), the vibration-proof member 32 is preferably provided, on the face in contact with the other member 2 or on the face in contact with the core member 31, with projections 4 similar to those provided in the vibration-proof member 33. The insulator (I) having a sheet-like body (1) as shown in FIGS. 1 to 5 or FIG. 7 is preferred as the vibration-proof member 32. FIG. 26 shows an example of the insulator (III) wherein the vibration-proof member 32 has substantially the same shape as the insulator shown in FIG. 7 has. In the vibration-proof member 32 shown in FIG. 26, ridge-shaped projections 4 are disposed in concentric circles on the upper face of the member 32 so as to constitute projection arrays 5 (5a, 5b and 5c). The height of the projections 4 is greatest in the array 5a, then decreases gradually or stepwise in the outer array 5b and the most outer array 5c in that order. The vibration-proof member 32 is provided on the bottom face thereof with concentric circular grooves 6.

The means for attaching the insulator (III) to the other member 2 is not particularly limited. Thus, for example, attachment may be performed by means of a bolt 34a and a nut 34b, as shown in FIG. 23, or by means of an embedded bolt 8a and a nut 8b, as shown in FIG. 25.

The above-mentioned insulators (I), (II) and (III), which are excellent in vibration-proof property, can be used satisfactorily as vibration insulators for a variety of equipments and instruments. For instance, they can favorably be used for record player, radio set, amplifier, telephone, speaker cabinet, video recorder, facsimile telegraph, teleprinter, television set, car stereo, tape recorder, and various measuring instruments such as chemical balance. When they are used as vibration insulators for a record player, for instance, deterioration in sound quality as caused by howling or outside vibration can be prevented to a satisfactory extent, so that high fidelity reproduction of the sounds of the original performance can be achieved. When they are used as vibration insulators for a chemical balance, for instance, errors in weighing as caused by outside vibration can be eliminated.

The rubber material of the present invention is also useful as the material for making a deadening member for turntable.

The turntable in record player is usually made of an aluminum alloy. Since the turntable made of the alloy is light in weight, it tends to vibrate, especially at the start, and also the so-called squealing phenomenon takes place. These lead to deterioration in quality of reproduced sound. For preventing vibration of the turntable and squealing at the start, a deadening member composed of hard rubber is attached to the back of the turntable. However, the conventional deadening member composed of hard rubber cannot prevent these phenomena to a satisfactory extent.

It has now been found that a deadening member made of the rubber material of the present invention can satisfactorily prevent vibration of the turntable and squealing at the start. More particularly, the deadening member composed of the rubber material of the present invention makes it possible to attain high quality of reproduced sound, because the rubber material has an excellent vibration-abosorbing property so that vibration and squealing at the start of the turntable can be prevented to a satisfactory extent and because the rubber material efficiently absorbs vibrations caused, for example, by the driving motor, which is responsible for the excellent vibration-absorbing property thereof, so that transmission of such vibrations to the record can be prevented.

In using the rubber material of the present invention as the material of a deadening member, the shape thereof is not critical. Some examples are illustrated by referring to drawings.

Figure 27:
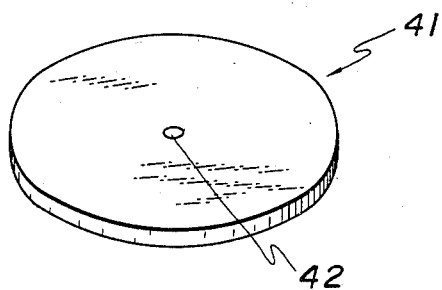
FIG. 27 is a perspective view of an example of the deadening member wherein the rubber material of the present invention is used and FIG. 28 is a cross-sectional view illustrating the state that the deadening member shown in FIG. 27 is attached to a turntable.
Figure 28:
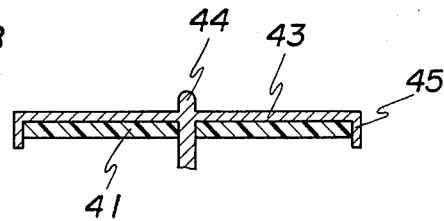

FIG. 27 is a perspective view illustrating an example of the deadening member wherein the rubber material of the present invention is used. FIG. 28 is a cross-sectional view illustrating the state that the deadening member is attached to a turntable.

Numeral 41 indicates a disk-shaped deadening member composed of the rubber material of the present invention. At the center of the deadening member, there is made a hole 42 into which the center shaft 44 of a turntable 43 is to fit. The deadening member 41 is attached to the back of the turntable 43, for instance, by the use of an adhesive.

When the deadening member 41 is disk-shaped, the thickness thereof is usually about 1 mm. to about 10 mm.

Figure 29:
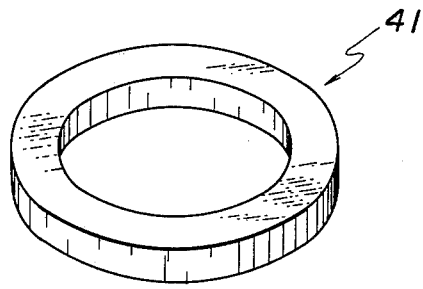
FIG. 29 and FIG. 30 are perspective views respectively illustrating other examples of the deadening member wherein the rubber material of the present invention is used.
Figure 30:
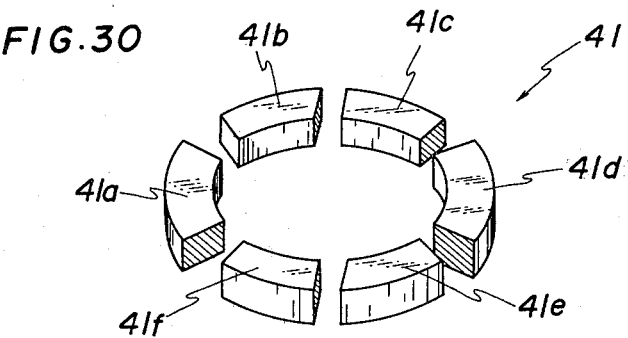

The shape of the deadening member 41 is not limited to the disk-like one mentioned above, but various shapes may be employed. For instance, the deadening member may be ring-shaped, as shown in FIG. 29. Furthermore, it may be constituted by a plurality of divided portions or segments, for example, segments 41a, 41b, 41c, 41d, 41e and 41f, as shown in FIG. 30.

The means for attaching the deadening member 41 to the turntable 43 is not particularly limited, but generally adhesion using an adhesive is preferred. When the deadening member 41 is ring-shaped, for instance, as shown in FIG. 29, it may be attached to the turntable 43 through an engaging member (not shown) provided on the flange 45 of the turntable 43.

It is not necessary that the whole body of the deadening member 41 should be composed of single rubber material, but the deadening member may be composed of a plurality of rubber materials having different physical properties. For example, a laminated sheet comprising a sheet of a rubber material having an A hardness of 5° and a sheet of a rubber material having an A hardness of 15° may be adopted.

(2) Shock-absorbing material

The rubber material of the present invention is useful as the material constituting a bumper for use in automobile, etc.

A steel bumper has so far been used in the automobile. In response to increasing safety requirement, a bumper made of urethane rubber also has been introduced. However, even such an urethane rubber bumper is unsatisfactory in respect to shock absorption.

The rubber material of the present invention is much superior as the bumper material to the conventional urethane rubber. This is supposedly due to the fact that the rubber material of the present invention is low in hardness and high in impact resilience as compared with the conventional urethane rubber. This becomes clear from the indirect experiment mentioned in the following:

Experiment

Physical properties of a rubber material of the present invention, a conventional urethane rubber and a typical example of ethylene-propylene-diene rubber (hereinafter referred to as EPDM) which is lower in hardness but higher in impact resilience than the urethane rubber are shown in Table 1. The rubber material of the present invention used herein is the one in accordance with Example 4 given hereinafter.

TABLE 1

| Physical property | Rubber material | | |
| --- | --- | --- | --- |
| | The invention | Conventional EPDM rubber | Conventional urethane rubber |
| A hardness (degree) | 6 | 70 | 90 |
| Impact resilience (%) | 81 | 34 | 29 |
| Tensile strength (kg./cm.$^2$) | 18 | 126 | 455 |
| Elongation (%) | 398 | 370 | 550 |
| Specific gravity | 0.977 | 1.21 | 1.27 |

The rubber material of the present invention and EPDM were selected from the rubber materials shown in Table 1 and cylindrical test pieces, 29 mm. in diameter and 12.5 mm. in height, were prepared therefrom. Each test piece was placed in a destructive tester and subjected to pressure by a press, and the influence of each test piece upon the destructive tester was examined.

Figure 31:
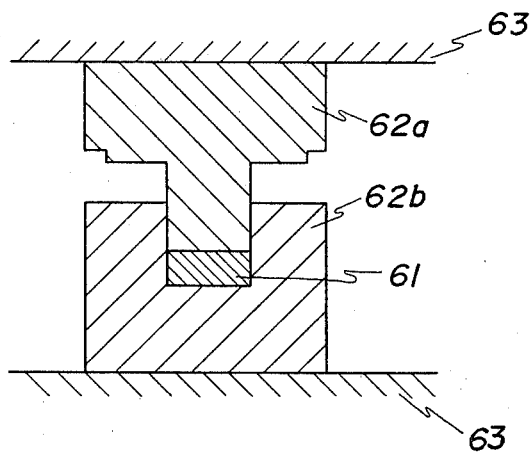
FIG. 31 is a schematic representation of the destructive test apparatus used in examining rubber materials for possible influence upon the tester.

The tester is schematically illustrated in FIG. 31. In FIG. 31, numeral 61 is a rubber test piece, numeral 62a is a male mold of the destructive tester, numeral 62b is a female mold of the destructive tester and numeral 63 is a press. The male and female molds 62a and 62b are made of a rolled steel for general constructions as specified in JIS G 3101.

Figure 32:
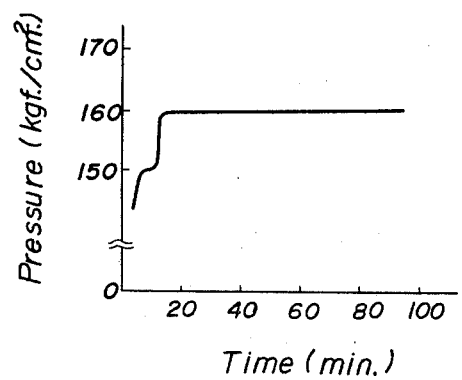
FIG. 32 and FIG. 33 are diagrams illustrating pressure curves for the test piece from the rubber material of the present invention and the test piece from a conventional ethylene-propylene-diene rubber, respectively.
Figure 33:
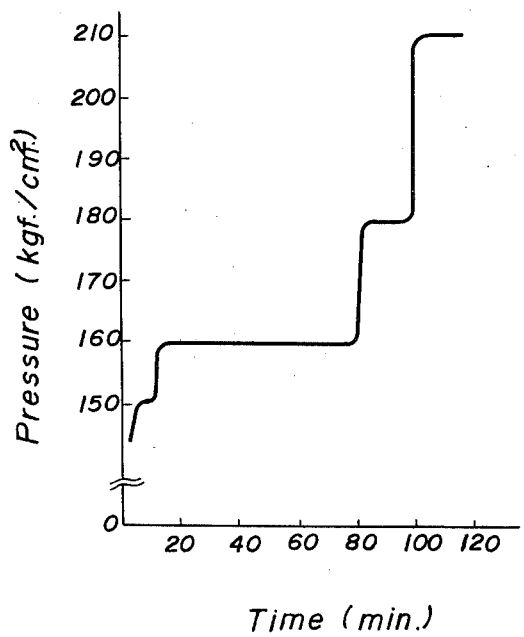

Each test piece was placed in the above-mentioned tester, and subjected to pressure in a manner as shown in FIG. 32 for the test piece of the rubber material of the present invention or as shown in FIG. 33 for the test piece of EPDM.

When a pressure of 160 kgf./cm². was applied to the test piece of the rubber material of the present invention, the thickness of the test piece was reduced from the orginal 12.5 mm. to 9 mm. The pressure hardly exceeded 160 kgf./cm². The destructive tester 62a, 62b did not reveal any change therein.

Figure 34:
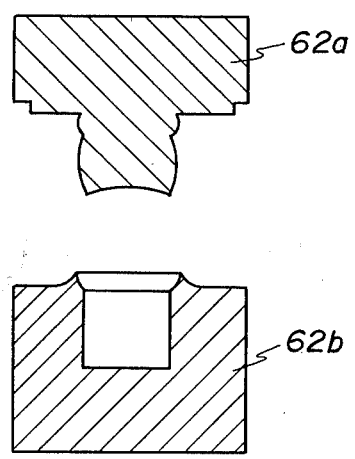
FIG. 34 is a cross-sectional view illustrating the state of deformation of the tester after the test has been carried out employing the test piece from the ethylene-propylene-diene rubber.

In the case of the EPDM test piece, a pressure of 210 kgf./cm². caused almost no compression of the test piece, but instead, the destructive tester 62a, 62b was destructed as shown in FIG. 34.

According to the above test, the conventional EPDM caused deformation of the steel tester at a pressure of 210 kgf./cm². This fact indicates that such a rubber material high in hardness and low in impact resilience as EPDM cannot absorb effectively outside pressure. On the other hand, the rubber material of the present invention did not cause any change in the steel tester an did not allow easy rise in press pressure to 160 kgf./cm². and above. These facts suggest that the rubber material of the present invention, due to the low hardness and high impact resilience thereof, can efficiently absorb outside pressure. The same can be said of the impact resistance, and consequently the rubber material of the present invention, which is low in hardness but high in impact resilience, is superior as a shock-absorbing material for shock-absorbing members such as bumper, to EPDM which is high in hardness and low in impact resilience. As for the conventional urethane rubber, the data shown in Table 1 clearly indicate that this rubber is higher in hardness and lower in impact resilience than EPDM, and therefore the urethane rubber is supposed to be more inferior in capacity of absorbing impact force.

Another characteristic feature of the rubber material of the present invention is that when subjected to an excessive impact force of about more than 100 kg./cm²., it is broken to pieces. This property is advantageous when the rubber material is used in making an automobile bumper. Thus, when an automobile is exposed to an impact force which would be fatal to humans in the automobile, the bumper composed of the rubber material of the present invention is broken to pieces, whereby the impact force is converted to kinetic energy of the broken pieces and the impact force against the automobile body and human bodies is sharply reduced.

In case the rubber material of the invention is used as a material of shock-absorbing members such as bumper, it is particularly preferred that the rubber material has an A hardness of 5° to 15°, an impact resilience of not less than 60%, and if necessary, further a tensile strength of 10 to 50 kg./cm². and an elongation of 300 to 600%.

In using the rubber material of the present invention as a material of bumper, the shape or the like is not particularly limited. Some examples are explained by referring to drawings.

Figure 35:
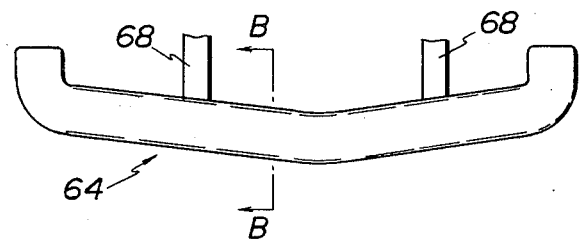
FIG. 35 is a plan view of an example of the bumper wherein the rubber material of the present invention is used and FIG. 36 is an enlarged cross-sectional view taken along the line B—B in FIG. 35.
Figure 36:
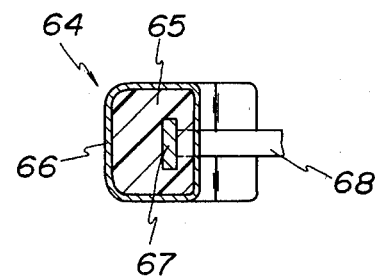

FIG. 35 is a plan view illustrating an example of the bumper wherein the rubber material of the present invention is used. FIG. 36 is an enlarged cross-sectional view taken along the line B—B in FIG. 35. In FIGS. 35 and 36, numeral 64 is a bumper body comprising a core body 65 made of the rubber material of the present invention and a covering 66 enclosing the core body. A reinforcing member 67 composed of a material such as steel, hard rubber or hard synthetic resin is embedded in the core body 65 substantially over the whole length of the core body. To the reinforcing member 67 are connected fixing membes 68, 68 for attaching the bumper body 64 to the chassis of the automobile.

The examples of the material constituting the covering 66 are hard rubbers (e.g. having an A hardness of not less than 40°, preferably not less than 60°) such as urethane rubber, EPDM and styrene-butadiene rubber, and hard synthetic resins. Since the covering 66 is provided for the purpose of protecting the soft core body 65 composed of the rubber material of the present invention, the thickness of the covering may be about 1 mm. to about 5 mm. The covering 66 may be omitted.

The thickness (as measured in the horizontal direction) of the core body 65 is about 30 mm. to about 200 mm. for practical use, although a greater thickenss might be preferred from the viewpoint of impact resistance.

Figure 37:
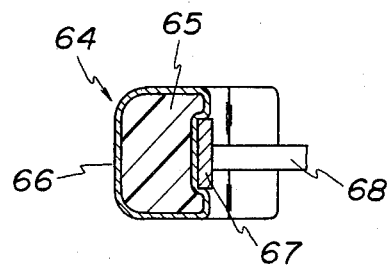
FIG. 37 is a cross-sectional view illustrating another example of the bumper.

The reinforcing member 67 need not be embedded in the core body 65 but may be attached to the rear face of the bumper body 64, for instance, as shown in FIG. 37. Attachment in that case may be performed by various means such as insertion, adhesion and screwing.

The bumper body 64 may also be attached to a ready-made steel bumper or the like directly. In that case, the reinforcing member 67 may be omitted.

The rubber material of the present invention is useful not only in making an automobile bumper but also in making a variety of shock-absorbing members. Important examples are fenders for use in ship's side, quay wall and the like, and shock absorbers in sports field for protecting players from damages upon bumping.

(3) Sealing material

The rubber material of the present invention, due to the excellent shock-proof and shock-absorbing properties thereof, is useful as a sealing material for a variety of uses, for example, sealing members for the doors of automobile, building, refrigerator, etc.

A conventional sealing member for automobile door is usually composed of sponge rubber. The sponge rubber is produced by foaming a rubber material originally having a high hardness and a low impact resilience (e.g. an A hardness of 60° to 70° and an impact resilience of 30 to 35%) and has a reduced hardness as a result of interposition of air, but the impact resilience is considerably low. In case that such sponge rubber is used as a sealing material, the cellular structure, when once broken by repeated opening and closing of the door, will lose the property of low hardness, and the material will then be unable to function as a sealing material. If fingers are caught in the door, an impact force will be exerted directly on the fingers because of the low impact resilience of the sealing material, whereby the possibility of the fingers being damaged is high.

In contrast thereto, a sealing member comprising the rubber material of the present invention does not show any decrease in performance due to destruction of the cellular structure as in the sponge rubber but endures semipermanently, since the rubber material itself is a solid rubber having a low hardness and a high impact resilience. Even when fingers are caught in the door, the impact force, which otherwise would act upon the fingers, is buffered as a result of the high impact resilience of the rubber material, whereby the possibility of injury is much reduced.

Figure 38:
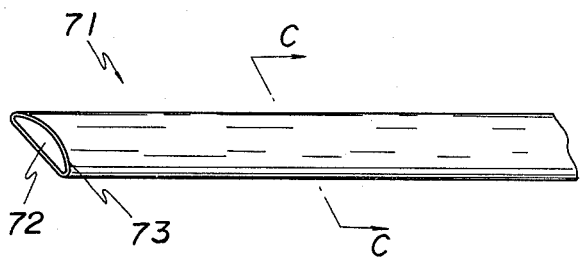
FIG. 38 is a partial perspective view illustrating an example of the sealing member wherein the rubber material of the present invention is used and FIG. 39 is an enlarged cross-sectional view taken along the line C—C in FIG. 38.
Figure 39:
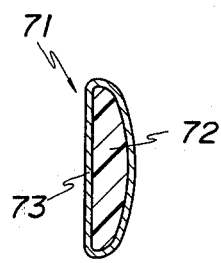

In using the rubber material of the invention as a material of sealing members, the shape or the like is not particularly limited. Thus, for example, such a shape as shown in FIGS. 38 to 39 may be used. FIG. 38 is a partial perspective view of an example of the sealing member wherein the rubber material of the present invention is used. FIG. 39 is an enlarged cross-sectional view taken along the line C—C in FIG. 38. In FIGS. 38 to 39, numeral 71 is a sealing member in the form of a band. The sealing member 71 is composed of a core body 72 made of the rubber material of the present invention and a covering 73. Examples of the material of the covering 73 are usual soft rubbers such as urethane rubber, EPDM and styrene-butadiene rubber, and soft synthetic resins such as polyvinyl chloride. The shape in section of the sealing member 71 may be modified in various ways depending on the particular use thereof.

(4) Cushioning materials

By virtue of its excellent cushioning properties, the rubber material of the present invention can be used with advantage for various kinds of cushioning members, e.g. as those of chair, bed, mattress, etc.

While sponge rubber has been conventionally employed for a cushioning member, this material is low in hardness but low in impact resilience and not necessarily good in cushioning properties as already noted hereinbefore. Taking a sponge rubber mattress as an example, it has only such a low impact resilience that it is virtually devoid of cushioning action when its thickness is small. Even when the thickness is large, the human body completely sinks into the mattress as a whole and as a result, the mattress does not display as a cushioning performance as might be desired.

In contrast, the rubber material of the present invention, when used as a cushioning member, displays an excellent cushioning performance due to its low hardness and high impact resilience and even when its thickness is comparatively small, the rubber material discharges its mission adequately as a cushioning member.

Figure 40:
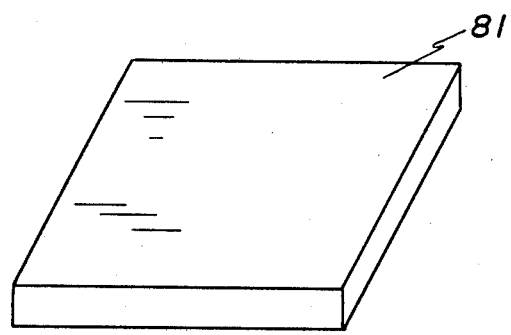
FIG. 40 is a perspective view illustrating an example of the cushioning member wherein the rubber material of the present invention is used.

In using the rubber material of the present invention as a cushioning member, there is no particular limitation on its shape but the shape shown as an example in FIG. 40 may be used. FIG. 40 is a perspective view showing an embodiment of the cushioning member in which the rubber material of the present invention is used. Indicated by numeral 81 is a planar cushioning member made of the rubber material of the present invention, which member is composed of a single rubber material.

Figure 41:
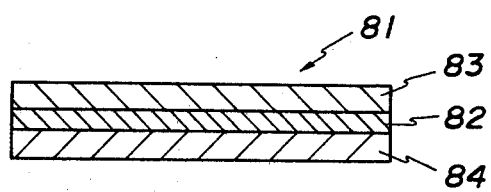
FIG. 41 is a vertical cross-sectional view illustrating a cushioning member having a laminated structure comprising a plurality of rubber materials different in physical properties.

In using the rubber material of the present invention as a cushioning member, a plurality of layers made of rubber materials having different physical properties may be used in laminated construction. For example, as illustrated in FIG. 41, the cushioning member may assume a three-layer construction, a core layer 82 which is made of a rubber material of the present invention having comparatively low hardness and low impact resilience (e.g. an F hardness of 60°, an impact resilience of 55%) with an upper layer 83 and a lower layer 84 being made of a rubber material of the present invention having comparatively high hardness and high impact resilience (e.g. an A hardness of 8°, an impact resilience of 70%).

(5) Tires

By virtue of its low hardness and high impact resilience, the rubber material of the present invention is useful in such applications as non-puncture tires, solid tires, etc.

There have been known tubeless tires each comprising a tire body and a sticky rubber layer secured to the inner surface thereof so that even if the tire is penetrated by a nail, for instance, the air within the tire will not escape out. However, even if the damage is serious and the tire cannot heal on its own, the inside air excapes and, at times, a burst or other serious accident may take place. Moreover, on a rugged road surface, the deformation of the rim flange could result in air leaks. Then, these tires are of limited utility.

However, with the rubber material of the present invention, there can be produced perfect non-puncture tires, completely free from the above-mentioned disadvantages of the conventional tubless tires.

Figure 42:
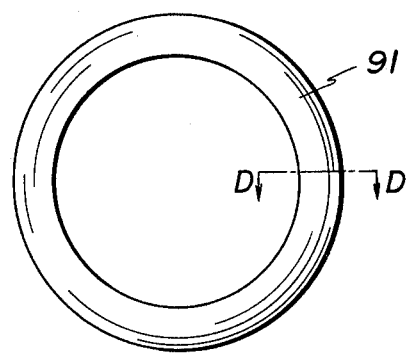
FIG. 42 is a plan view of a ring member for use in a non-puncture tire, which membker is composed of the rubber material of the present invention
Figure 43:
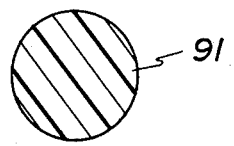
FIG. 43 is an enlarged cross-sectional view taken along the line D—D in FIG. 42.
Figure 44:
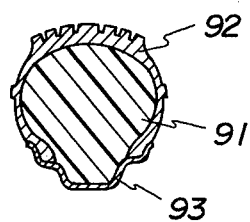
FIG. 44 is a cross-sectional view of a non-puncture tire equipped with the ring member.

The production process for this non-puncture tire is illustrated in the plan view of FIG. 42 and the cross-sectional view of FIG. 43 (taken along the line D—D of FIG. 42). Thus, the rubber material of the present invention is used to fabricate a ring member 91 having a substantially circular cross-section and sized to fit closely into the tire. Then, the ring member 91 is fitted into the tire 92 and a rim 93 is set in position, as shown in FIG. 44.

Unlike the conventional tube-tire and tubeless tire, the non-puncture tire described above does not include air inside thereof but, instead, contains the ring member 91 made of the rubber material of the present invention, with the result that there is no fear of a puncture even if a nail pierces the tire. Moreover, even if a serious accident such as a tear of the tire takes place, the ring member 91 inside the tire 92 bears the load till the car has skidded to a stop, so that one can avoid tragedies such as violent collision and fall which would otherwise result from the impossibility of steering due to a burst of the tire.

Furthermore, since the non-puncture tire mentioned above is such that its ring member 91 is made of the rubber material of the present invention which has low hardness and high impact resilience, it has a cushioning property at least comparable or even superior to that of the conventional tube-tire and tubeless tire.

In addition, in the case of this non-puncture tire whose ring member 91 bears a part of the load, the amount of the reinforcing member employed in the tire 92 can be reduced so that the tire itself may be of more economical grade.

Figure 45:
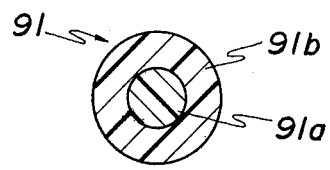
FIG. 45, FIG. 46, FIG. 47 and FIG. 48 are cross-sectional views respectively illustrating various modifications of the ring member.
Figure 46:
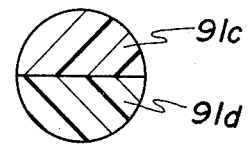
Figure 47:
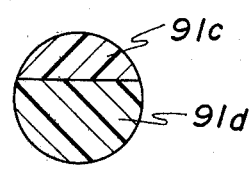

While the above-mentioned ring member 91 may be made of a single rubber material as shown in FIG. 43, it may also be made of a plurality of rubber materials having different physical properties. For instance, as illustrated in FIG. 45, the core 91a may be made of a rubber material of the present invention which has comparatively high hardness and high impact resilience (e.g. an A hardness of 9°, an impact resilience of 70%) and the shell or peripheral portion 91b made of a rubber material of the present invention which has comparatively low hardness and low impact resilience (e.g. an A hardness of 1°, an impact resilience of 60%). The above different rubber materials may be used in a reversed relation. These products display a stable cushioning performance over a broad range of low speed to high speed. Alternatively, as shown in FIGS. 46 and 47, the ring member 91 may be divided into two segments (or three or more segments) along a plane perpendicular to its radius and the tread-side segment 91c is made of a rubber material of the present invention which has comparatively high hardness and high impact resilience (e.g. an A hardness of 9°, an impact resilience of 70%) with the rim-side segment 91d being made of a rubber material of the present invention which has comparatively low hardness and low impact resilience (e.g. an A hardness of 1°, an impact resilience of 60%). In this case, these rubber materials may be used in a reversed relation.

Figure 48:
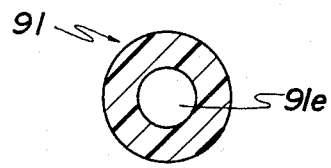

The above-described non-puncture tire can be used advantageously with autocycles, motorbikes, bicycles, wheel-chairs, etc. as well as automobiles. In applications which do not involve too large loads, such as motorcycles, motorbikes, bicycles, wheel-chairs, etc., a hollow space 91e may be provided within the ring member 91 as illustrated in FIG. 48.

The rubber material of the present invention is also suitable for solid tires which are used in baby buggies, baby cars, shopping carts, carriages used in factories and warehouses, and the like.

While conventional solid tires are made of materials such as natural rubber, styrene-butadine rubber and urethane rubber, these tires are invariably high in hardness and low in impact resilience and, therefore, quite unsatisfactory in cushioning performance. Use of the low hardness, high resilience rubber material of the present invention instead of such conventional rubbers enables one to obtain solid tires having excellent cushioning properties.

Figure 49:
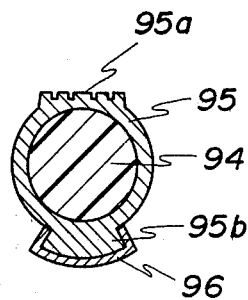
FIG. 49 is a cross-sectional view illustrating an example of the solid tire wherein the rubber material of the present invention is used.

FIG. 49 is a cross-sectional view showing an embodiment of the solid tire using the rubber material of the present invention. Indicated by numeral 94 is a ring core having a substantially circular cross-section which is made of the rubber material of the present invention. The ring core 94 is covered with a cover member 95. The tread (ground contact) face of the cover member 95 is provided with anti-slip grooves 95a, while the opposite side of the member 95 is provided with an ear portion 95b adapted to engage a rim 96. Like the ring member 91 mentioned previously, this ring core 94 may also be made of rubber materials having different physical properties (cf. FIGS. 45 to 47) or a hollow space may also be provided therein (cf. FIG. 48). The cover member 95 may be made of any of usual rubber materials such as styrene-butadiene rubber, urethane rubber, EPDM, and a blend of natural rubber, butadiene rubber and styrene-butadiene rubber.

The solid tire using the rubber material of the present invention has such an improved cushioning property that it can be applied advantageously to such equipments as bicycles, motorbikes and wheel-chairs, where solid tires have so far been considered unusable.

The rubber material of the present invention will be explained in more detail by referring to Examples.

EXAMPLES 1 TO 8

Cured rubber sheets were produced using the rubber compositions shown in Table 2.

The rubber component was first scoured at about 60° C. and then kneaded with other components by means of a Banbury mixer. The resultant was further kneaded with a roll and sheeted out to give an uncured rubber sheet of about 10 mm. thick. A sheet of a desired dimension was cut out from the sheet and cured by a press machine with a given mold under a pressure of 150 kg./cm$^2$. at 155° C. for 20 minutes to give a cured rubber sheet.

Test pieces were cut out from the cured rubber sheet and various physical properties were measured on the test pieces. The results thereof are shown in Table 3. Measurements of impact resilience, tensile strength and elongation were conducted according to JIS K 6301-1969.

TABLE 2

| | Rubber composition (in parts) | | | | | | | |
|---|---|---|---|---|---|---|---|---|
| | Example No. | | | | | | | |
| Components | 1 | 2 | 3 | 4 | 5 | 6 | 7 | 8 |
| Norsorex 150NA (Note 1) | 250 | 250 | 250 | 250 | 250 | 250 | — | — |
| Norsorex (Note 2) | — | — | — | — | — | — | 80 | 75 |
| Nipol SBR 1712 (Note 3) | — | — | — | — | — | — | 27.5 | — |
| Esplene 505 (Note 4) | — | — | — | — | — | — | — | 25 |
| DOG Factice F10 (Note 5) | 300 | 240 | 120 | 225 | 230 | 200 | 420 | 330 |
| Sunthene 255 (Note 6) | 120 | 130 | 280 | 410 | 400 | — | 560 | 450 |
| Sundex 790 (Note 7) | — | — | — | — | — | 1000 | — | — |
| Rapeseed oil | — | — | — | — | — | 15 | — | — |
| Dioctyl phthalate | — | 10 | — | 45 | 50 | 35 | — | 80 |
| FEF carbon | — | — | 50 | 50 | 50 | — | 40 | 80 |
| MT carbon | 35 | — | — | — | — | 50 | — | — |
| SRF carbon | — | 40 | — | — | — | — | — | — |
| Zinc oxide | 5 | 5 | 5 | 5 | 5 | 5 | 5 | 5 |
| Stearic acid | 1 | 1 | 1 | 1 | 1 | 1 | 1 | 1 |
| Sumilizer MDP (Note 8) | — | — | 2 | 2 | — | — | 1 | 1 |
| Antioxidant DDA (Note 9) | 1 | 1 | — | — | 2 | 2 | — | — |
| Suntight S (Note 10) | 1 | 1 | — | — | 1 | 1 | — | — |
| Sulfur | 2 | 2 | 2 | 2.5 | 2.5 | 2.5 | 2.5 | 2.5 |

TABLE 2-continued

| | Rubber composition (in parts) | | | | | | | |
|---|---|---|---|---|---|---|---|---|
| | Example No. | | | | | | | |
| Components | 1 | 2 | 3 | 4 | 5 | 6 | 7 | 8 |
| Sunceller CZ (Note 11) | 6 | 8 | 9 | 10 | 8 | 10 | 10 | 10 |

Note 1: Polynorbornene (Norsorex, average molecular weight of not less than $2 \times 10^6$) extended with 150 parts of naphthenic oil per 100 parts of polynorbornene, sold by Nippon Zeon Co., Ltd. (Norsorex: registered trademark)
Note 2: Polynorbornene (average molecular weight of not less than $2 \times 10^6$) sold by Nippon Zeon Co., Ltd.
Note 3: Styrene-butadiene rubber extended with 37.5 parts of a high aromatic oil per 100 parts of the rubber, made by Nippon Zeon Co., Ltd.
Note 4: Ethylene-propylene-diene rubber made by Sumitomo Chemical Co., Ltd.
Note 5: Amber sulfur factice made by D. O. G. Deutsche Oelfabrick Ges. f. Chem. Erz. mbh & Co.
Note 6: Naphthenic oil made by Japan Sunoil Co., Ltd.
Note 7: Aromatic oil made by Japan Sunoil Co., Ltd.
Note 8: 2,2'-Methylene-bis(4-methyl-6-tert.-butylphenol) made by Sumitomo Chemical Co., Ltd.
Note 9: Diphenylamine antioxidant made by Bayer A. G.
Note 10: Microcrystalline wax made by Seiko Kagaku Kabushiki Kaisha
Note 11: Curing accelerator made by Sanshin Kagaku Kabushiki Kaisha

TABLE 3

| Ex. No. | Hardness (degree) | | | Impact resilience (%) | Tensile strength (kg./cm.$^2$) | Elongation (%) | Specific gravity |
|---|---|---|---|---|---|---|---|
| | A hardness | C hardness | F hardness | | | | |
| 1 | 23 | — | — | 73 | 16 | 293 | 0.999 |
| 2 | 18 | — | — | 71 | 21 | 283 | 0.997 |
| 3 | 9 | — | — | 74 | 10 | 281 | 0.987 |
| 4 | 6 | — | — | 81 | 18 | 398 | 0.977 |
| 5 | 1 | 11 | 73 | 63 | 6.5 | 387 | 0.977 |
| 6 | — | — | 31 | 51 | 0.3 | 490 | 1.004 |
| 7 | 5 | — | — | 67 | 2 | 161 | 0.945 |
| 8 | 7 | — | — | 55 | 5 | 155 | 0.979 |

EXAMPLES 9 TO 15

Cured rubber sheets were prepared in the same manner as in Examples 1 to 8 except that the rubber compositions shown in Table 4 were used. The physical properties were measured on the obtained cured rubber sheets. The results thereof are shown in Table 5.

TABLE 4

| | Rubber composition (in parts) | | | | | | |
|---|---|---|---|---|---|---|---|
| | Example No. | | | | | | |
| Components | 9 | 10 | 11 | 12 | 13 | 14 | 15 |
| Nipol SBR 1712 | 137.5 | 137.5 | — | — | — | — | — |
| Nipol IR 2200 (Note 1) | — | — | 100 | — | — | — | — |
| Natural rubber | — | — | — | 100 | — | — | — |
| Nordel 1040 (Note 2) | — | — | — | — | 100 | — | — |
| Baypren 112 (Note 3) | — | — | — | — | — | 100 | — |
| Millathane 76 (Note 4) | — | — | — | — | — | — | 100 |
| DOG factice F 10 | 200 | 230 | 200 | 250 | 250 | — | — |
| DOG factice NP 17 (Note 5) | — | — | — | — | — | 240 | 200 |
| DOG factice DS · SOFT (Note 6) | — | — | 15 | — | — | — | — |
| Sunthene 255 | 200 | 200 | 165 | 240 | 200 | 200 | 250 |
| Sunpar 110 (Note 7) | — | — | 70 | — | — | — | — |
| Thiokol TP-95 (Note 8) | — | — | — | — | — | — | 10 |
| SRF carbon | — | — | 5 | — | — | — | — |
| MT carbon | 20 | 60 | — | 80 | 50 | 45 | — |
| Light calcium carbonate | — | — | — | — | — | — | 10 |
| Zinc oxide | 5 | 5 | 5 | 5 | 5 | — | — |
| Magnesia | — | — | — | — | — | 4 | — |
| Zinc stearate | — | — | — | — | — | — | 0.5 |
| Stearic acid | 1 | 1 | 1 | 1 | 1 | 1 | — |
| Antioxidant DDA | 2 | 2 | 1 | 1 | 1 | 1 | — |
| Suntight S | 1 | 1 | 1 | 1 | 1 | 1 | — |
| Sulfur | 2 | 2 | 2.2 | 2 | 2.5 | 2 | 1.5 |
| Sunceller CZ | 4 | 4 | 2 | — | — | — | — |
| Nocceler DM (Note 9) | — | — | — | 2.7 | — | — | 3 |
| Nocceler D (Note 10) | — | — | — | 0.7 | — | — | — |
| Nocceler TT (Note 11) | — | — | — | 0.4 | 1.2 | — | — |
| Nocceler M (Note 12) | — | — | — | — | 2 | — | 2 |
| Nocceler TRA (Note 13) | — | — | — | — | 1.2 | — | — |
| Nocceler DT (Note 14) | — | — | — | — | — | 1.1 | — |
| Nocceler TS (Note 15) | — | — | — | — | — | 1.1 | — |

TABLE 4-continued

| | Rubber composition (in parts) | | | | | | |
|---|---|---|---|---|---|---|---|
| | Example No. | | | | | | |
| Components | 9 | 10 | 11 | 12 | 13 | 14 | 15 |
| Thiokol ZC 456 (Note 16) | — | — | — | — | — | — | 1 |

Note 1: Isoprene rubber made by Nippon Zeon Co., Ltd.
Note 2: Ethylene-propylene-diene copolymer made by E. I. Du Pont de Nemours & Co.
Note 3: Chloroprene rubber made by Bayer A. G.
Note 4: Urethane rubber made by Technical Sales & Engineering Inc.
Note 5: Amber sulfur factice made by D. O. G. Deutsche Oelfabrick Ges. f. Chem. Erz. mbh & Co.
Note 6: Amber soft sulfur factice made by D. O. G. Deutsche Oelfabrick Ges. f. Chem. Erz. mbh & Co.
Note 7: Paraffinic oil made by Japan Sunoil Co., Ltd.
Note 8: Plasticizer made by Thiokol Corp.
Note 9: Curing accelerator made by Ouchi Chemical Industry Co., Ltd.
Note 10: Curing accelerator made by Ouchi Chemical Industry Co., Ltd.
Note 11: Curing accelerator made by Ouchi Chemical Industry Co., Ltd.
Note 12: Curing accelerator made by Ouchi Chemical Industry Co., Ltd.
Note 13: Curing accelerator made by Ouchi Chemical Industry Co., Ltd.
Note 14: Curing accelerator made by Ouchi Chemical Industry Co., Ltd.
Note 15: Curing accelerator made by Ouchi Chemical Industry Co., Ltd.
Note 16: Curing accelerator made by Thiokol Corp.

TABLE 5

| Ex. No. | Hardness (degree) | | | Impact resilience (%) | Tensile strength (kg./cm.$^2$) | Elongation (%) | Specific gravity |
|---|---|---|---|---|---|---|---|
| | A hardness | C hardness | F hardness | | | | |
| 9 | 9 | 30 | — | 62 | 8 | 258 | 1.009 |
| 10 | 18 | 46 | — | 59 | 21 | 364 | 1.016 |
| 11 | 8 | 28 | — | 64 | 6 | 330 | 0.921 |
| 12 | 23 | 51 | — | 62 | 5.4 | 223 | 0.984 |
| 13 | 6 | 25 | — | 52 | 7 | 241 | 0.971 |
| 14 | — | 10 | 69 | 51 | 3.6 | 322 | 1.026 |
| 15 | 4 | 22 | — | 61 | 2 | 182 | 1.008 |

EXAMPLE 16

The steel front bumper was detached from a compact passenger car (total dead weight 640 kg.) (hereinafter referred to as car A) and using the bumper as a mold, a rubber bumper was fabricated of the rubber material of the present invention.

The rubber composition according to Example 4 was filled into the above-mentioned steel bumper and the whole was wrapped up in a wet cloth. This was then put in a vulcanizing can, in which it was steam-cured at 140° C. for 60 minutes. The rubber bumper was then taken out from the mold. The rubber bumper thus produced weighed 4.2 kg. and had a maximum thickness (along the horizontal direction) of 40 mm.

This bumper was subjected to the following impact test.

(1) Purpose of the test

While a collision of cars takes place often when the relative speed of vehicles is about 4.8 km. to about 16 km./hour, for example, at steering in parking areas, at starting the car or in a traffic jam, even such a mild collision results in substantial damages to cars and driver and passengers. This has by now been such a serious problem in the United States of America that governmental standard regulations have been established which require car manufacturers to build cars which would at least resist a collision impact to the rear bumper at a vehicle speed of 4.8 km./hour and a collision impact to the front bumper at a vehicle speed of 8.0 km./hour. The present test is based on the above-mentioned standard regulations.

(2) The procedures of the test

The rubber bumper produced above was secured to the front of the front bumper of the car A at four positions by means of cloth bands. The car A and another compact car (total dead weight 1075 kg; equipped with steel bumpers) (hereinafter referred to as car B) were positioned front-to-front at a distance of 5 meters and 3 passengers boarded into each car (the total weight of 3 passengers was about 180 kg. for each car). The car A was kept standing still with its handbrake disengaged and the car B was driven toward the car A to cause a collision at a speed of about 10 km./hour.

(3) Results of the test

Regarding the car A, the 3 passengers felt a slight impact but the car itself was not injured or damaged at all. Of course, the rubber bumper of the present invention was not affected, either.

The car B was not damaged at all and the 3 passengers of the car B hardly felt any impact.

EXAMPLE 17

The rubber composition of Example 4 was presscured under the same conditions as Examples 1 to 8 to produce a ring member 91 having the configuration shown in FIGS. 42 to 43. The ring member 91 had an inner diameter of 350 mm. and a sectional diameter of 50 mm.

The front and rear wheels of a commercial motorbikes were removed, the tube was taken out from each tire and, in place of the tube, the above-mentioned ring member was fitted as illustrated in FIG. 44. The tires thus fitted with the ring members were mounted on the above-mentioned motorbike and 10 drivers were instructed to drive the motorbike as trials. For control purposes, they were also instructed to test-drive a similar motorbike with the intact tires (i.e. equipped with tube-tires).

All the drivers rated the tires equipped with the ring members of the present invention by far superior to the tube-tires in driving comfort. The tires equipped with the ring members of the present invention showed especially a high performance on unpaved roads by absorbing vibrations from rugged surfaces effectively.

When the above-mentioned two motorbikes were driven on a road over which nails has been scattered, the tires equipped with the ring members of the present invention were not affected at all and the driving comfort was not altered, either. In contrast, the tube-tires underwent punctures, thus making further driving impossible.

EXAMPLE 18

Using the rubber compositions of Examples 3 and 5, the ring member 91 having the configuration illustrated in FIGS. 42 and 45 was manufactured. The core 91a of the ring member was made of the rubber composition of Example 3 and the peripheral portion 91b was made of the rubber composition of Example 5. The ring member 91 had an inner diameter of 350 mm. and a sectional diameter of 50 mm., and the core 91a had a sectional diameter of 25 mm.

The above ring member was fitted to the tire of a motorbike in the same manner as in Example 17 and the motorbike was test-driven. The test showed an excellent driving comfort. The tire was found even superior to the tire of Example 17 especially at a high driving speed of about 30 km./hour.

EXAMPLES 19 AND 20

Two different ring members 91 were prepared in the same manner as in Example 17 from the rubber compositions of Examples 2 and 7. Each ring member was fitted to the tires of a motorbike and the motorbike was then test-driven. The results showed an excellent driving comfort.

EXAMPLE 21

Using the rubber composition of Example 4 [for the core body 72] and the rubber composition of Table 6 [for the covering 73], a car door seal 71 having the configuration of FIGS. 38 and 39 was fabricated. The rubber composition for the core body and the rubber composition for the covering were simultaneously extruded with an extruding machine to produce a cord-shaped product which was then steam-cured in a vulcanizing can at 150° C. for 40 minutes. The seal 71 had a thickness of about 10 mm., a width of about 15 mm. and a covering thickness of 1 mm.

TABLE 6

| Rubber for covering | |
|---|---|
| Rubber composition (in parts) | |
| Nipol SBR 1712 | 137.5 |
| Sundex 790 | 20 |
| HAF carbon | 80 |
| Zinc oxide | 4 |
| Stearic acid | 1 |
| Antioxidant DDA | 2 |
| Suntight S | 4 |
| Sulfur | 1.5 |
| Sunceller CZ | 1.8 |
| Physical property | |
| A hardness (degree) | 57 |
| Impact resilience (%) | 40 |
| Tensile strength (kg./cm.$^2$) | 237 |
| Elongation (%) | 620 |

The above door seal was fitted in position as the door seals of a compact passenger car and subjected to a door operation test. The door seal was not damaged at all, retaining its original cushioning performance and air-tight performance fully even after the test. Moreover, when jammed by the doors, fingers were not injured at all.

EXAMPLES 22 AND 23

The production procedure of Example 21 was repeated except that the rubber compositions of Examples 8 and 9 were used as the rubber composition for the core body to fabricate two different car door seals. These seals were subjected to the door operation test. Neither of the seals was damaged in any manner.

EXAMPLE 24

The rubber composition of Example 4 was presscured under the same conditions as Examples 1 to 8 to manufacture a cushion (30 cm.×30 cm.×20 mm.) having the configuration shown in FIG. 40.

A panel of 10 testers was instructed to evaluate the seating quality of this cushion, using a commercial sponge rubber cushion (50 mm. thick) as a control. All the panelists rated the cushion of the present invention by far superior to the commercial product in seating quality.

EXAMPLES 25 TO 26

The production procedure of Example 24 was repeated except that the rubber compositions of Examples 11 and 13 were respectively employed to fabricate two different cushions. Both cushions proved to have excellent seating qualities.

EXAMPLE 27

Using the rubber compositions of Examples 3 and 6, a cushion (30 cm.×30 cm.×20 mm.) having the three-layer construction of FIG. 41 was fabricated. Thus, the rubber composition of Example 6 was used to prepare an uncured rubber sheet for the core layer 82 which was then sandwitched by uncured rubber sheets made of the rubber composition of Example 3 for the upper and lower layers 83 and 84. The laminate thus obtained was presscured under the same conditions as in Examples 1 to 8. The thickness of the core layer 82 was 10 mm. and that of the upper and lower layers 83 and 84 was 5 mm.

The resultant cushion proved to be more excellent than the cushion of Example 24 in seating quality.

EXAMPLE 28

The production procedure of Example 27 was repeated except that the rubber composition of Example 14 was used as the rubber composition for the core layer 82 to manufacture a cushion. This cusion was as good as the product of Example 27 in seating quality.

EXAMPLE 29

The rubber composition of Example 4 was presscured under the same conditions as in Example 1 to 8 to fabricate a vibration insulator having the configuration shown in FIGS. 1 to 5. The outline of the configuration is as follows:

Diameter of body 1: 50 mm.
Height of body 1: 3 mm.
Height of projections 4: 0.5 mm.
Depth of groove 6: 1.0 mm.

Using this insulator in place of each of the rubber vibration insulators of a commercial record player, a record listening test was carried out. High fidelity reproduction was obtained with a sufficient suppression of sound quality deteriorations due to howling and outside vibrations.

EXAMPLE 30

Using the rubber composition of Example 1, a vibration insulator having the configuration shown in FIGS. 9 and 10 was manufactured in the same manner as in Example 29. The outline of the configuration is as follows:

Diameter of body 1: 50 mm.
Height of body 1: 50 mm.
Height of projections 4: .5 mm.
Depth of concavity 6a: 10 mm.

Using the above insulator in place of each of the rubber vibration insulators of a commercial record player, a record listening test was carried out. High fidelity reproduction was obtained with a sufficient suppression of sound quality deteriorations due to howling and outside vibrations.

EXAMPLE 31

The rubber composition of Example 4 was press-cured under the same conditions as in Examples 1 to 8 to manufacture a vibration insulator having the configuration shown in FIGS. 16 to 21. The outline of the configuration is as follows:

Vibration-proof member 21
Diameter: 50 mm.
Height: 45 mm.
Height of projections 4: 0.5 mm.
Height of projections 23: 0.5 mm.
Vibration-proof member 22
Diameter of protrusion 22a: 29 mm.

Using the above insulator in place of the rubber vibration insulators of a commercial record player, a record listening test was carried out. High fidelity reproduction was obtained with a sufficient suppression of sound quality deteriorations due to howling and outside vibrations.

EXAMPLE 32

The production procedure of Example 31 was repeated except that the vibration-proof members 21 and 22 were made of the rubber compositions of Example 5 and Example 3, respectively, to manufacture a vibration insulator.

Using the resultant insulator in place of each of the rubber vibration insulators of a commercial record player, a record listening test was carried out. High fidelity reproduction was obtained with a sufficient suppression of sound quality deteriorations due to howling and outside vibrations.

EXAMPLE 33

The rubber composition of Example 4 was press-cured under the same conditions as in Examples 1 to 8 to manufacture a vibration insulator having the configuration shown in FIGS. 23 and 24. The core member 31 was made of the rubber composition shown in Table 6. The outline of the configuration is as follows:

Core member 31
Diameter: 50 mm.
Height: 18 mm.
Thickness of top plate and peripheral wall: 3 mm.
Vibration-proof member 32
Diameter: 50 mm.
Thickness: 2 mm.
Vibration-proof member 33
Maximum diameter: 56 mm.
Maximum height: 15 mm.
Height of projections 4: 0.5 mm.

Using the above insulator in place of each of the rubber vibration insulators of a commercial record player, a record listening test was carried out. High fidelity reproduction was obtained with a sufficient suppression of sound quality deteriorations due to howling and external vibrations.

EXAMPLE 34

The rubber compositions of Example 1 to 8 were respectively press-cured under the same conditions as in Examples 1 to 8 to prepare deadening members (8 mm. thick) having the disk-shaped configuration of FIG. 27.

Each of these deadening members was laminated onto the reverse side of an aluminum alloy turntable with an adhesive. The turntable was placed in position on a record player and a record performance test was carried out. The turntable started revolving smoothly without vibrations and squealing and helped reproduce excellent quality sound.

What is claimed is:

1. A rubber material which is a cured rubber of a rubber comprising (A) 100 parts by weight of a rubber component, (B) 100 to 2,000 parts by weight of a factice, and (C) 200 to 2,000 parts by weight of a softening agent, the cured rubber having a hardness of from a maximum of 30° as measured with an A-type rubber hardness tester to a minimum of 15° as measured with an F-type rubber hardness tester, an impact resilience of not less than 50% and a tensile strength of 0.1 to 100 kg/cm$^2$.

2. The rubber material of claim 1, wherein the hardness is not more than 20° as measured with the A-type rubber hardness tester.

3. The rubber material of claim 2, wherein the hardness is not more than 10° as measured with the A-type rubber hardness tester.

4. The rubber material of any of claims 1, 2 or 3, wherein the impact resilience is not less than 60%.

5. The rubber material of claim 4, wherein the impact resilience is not less than 70%.

6. The rubber material of claim 1, wherein the component (A) is polynorbornene.

7. The rubber material of claim 1, wherein (A) is a rubber component mainly composed of at least one member selected from the group consisting of natural rubber, isoprene rubber, chloroprene rubber, styrene-butadiene rubber, butadiene rubber, butyl rubber, ethylene-propylene rubber, ethylene-propylene-diene rubber, nitrile rubber, acrylic rubber, urethane rubber, chlorinated polyethylene, chlorosulfonated polyethylene, epichlorohydrin rubber, polysulfide rubber and silicone rubber.

8. A vibration-proof member which comprises a cured rubber material comprising (A) 100 parts by weight of a rubber component, (B) 100 to 2,000 parts by weight of a factice and (C) 200 to 2,000 parts by weight of a softening agent, the cured rubber having a hardness of from a maximum of 30° as measured with an A-type rubber hardness tester to a minimum of 15° as measured with an F-type rubber hardness tester, an impact resilience of not less than 50% and a tensile strength of 0.1 to 100 kg/cm$^2$.

9. The vibration-proof member of claim 7, wherein at least one of a plurality of faces which are to come into contact with other members is provided with a large number of projections.

10. A sound-proof member which comprises a cured rubber material comprising (A) 100 parts by weight of a rubber component, (B) 100 to 2,000 parts by weight of a factice and (C) 200 to 2,000 parts by weight of a softening agent, the cured rubber having a hardness of from a maximum of 30° as measured with an A-type rubber hardness tester to a minimum of 15° as measured with an F-type rubber hardness tester, an impact resilience of not less than 50% and a tensile strength of 0.1 to 100 kg/cm².

11. A shock-absorbing member which comprises a cured rubber material comprising (A) 100 parts by weight of a rubber component, (B) 100 to 2,000 parts by weight of a factice and (C) 200 to 2,000 parts by weight of a softening agent, the cured rubber having a hardness of from a maximum of 30° as measured with an A-type rubber hardness tester to a minimum of 15° as measured with an F-type rubber hardness tester, an impact resilience of not less than 50% and a tensile strength of 0.1 to 100 kg/cm².

12. The shock-absorbing member of claim 10, which is a bumper.

13. A sealing member which comprises a cured rubber material comprising (A) 100 parts by weight of a rubber component, (B) 100 to 2,000 parts by weight of a factice and (C) 200 to 2,000 parts by weight of a softening agent, the cured rubber having a hardness of from a maximum of 30° as measured with an A-type rubber hardness tester to a minimum of 15° as measured with an F-type rubber hardness tester, an impact resilience of not less than 50% and a tensile strength of 0.1 to 100 kg/cm².

14. A cushioning member which comprises a cured rubber material comprising (A) 100 parts by weight of a rubber components, (B) 100 to 2,000 parts by weight of a factice and (C) 200 to 2,000 parts by weight of a softening agent, the cured rubber having a hardness of from a maximum of 30° as measured with an A-type rubber hardness tester to a minimum of 15° as measured with an F-type rubber hardness tester, an impact resilience of not less than 50% and a tensile strength of 0.1 to 100 kg/cm².

* * * * *